US009075964B2

(12) United States Patent
Chatfield et al.

(10) Patent No.: US 9,075,964 B2
(45) Date of Patent: Jul. 7, 2015

(54) ELECTRONIC SYSTEM FOR THE PROTECTION AND CONTROL OF LICENSE TRANSACTIONS ASSOCIATED WITH THE ALTERATION OF REPLICATED READ ONLY MEDIA AND ITS BOUND LICENSED CONTENT

(75) Inventors: Keith Marshall Chatfield, Boulder, CO (US); Rod Brittner, Boulder, CO (US)

(73) Assignee: SOLABYTE CORPORATION, Lyons, CO (US)

( * ) Notice: Subject to any disclaimer, the term of this patent is extended or adjusted under 35 U.S.C. 154(b) by 0 days.

(21) Appl. No.: 13/586,443

(22) Filed: Aug. 15, 2012

(65) Prior Publication Data

US 2013/0212691 A1    Aug. 15, 2013

Related U.S. Application Data

(63) Continuation-in-part of application No. 13/316,160, filed on Dec. 9, 2011.

(60) Provisional application No. 61/421,444, filed on Dec. 9, 2010, provisional application No. 61/523,433, filed on Aug. 15, 2011.

(51) Int. Cl.
*G06F 21/00* (2013.01)
*G06F 21/10* (2013.01)
*G11B 20/00* (2006.01)

(52) U.S. Cl.
CPC ........ *G06F 21/105* (2013.01); *G11B 20/00115* (2013.01); *G11B 20/00123* (2013.01); *G11B 20/00659* (2013.01); *G11B 20/00666* (2013.01); *G11B 20/00869* (2013.01);

(Continued)

(58) Field of Classification Search
None
See application file for complete search history.

(56) References Cited

U.S. PATENT DOCUMENTS 4,838,843 A   6/1989   Westhoff
5,313,881 A   5/1994   Morgan
(Continued)

FOREIGN PATENT DOCUMENTS

EP    0 865 362       7/2003
JP    2001-344828    12/2001
(Continued)

OTHER PUBLICATIONS

The Kaleidescape System, "The Ultimate Entertainment Experience Brochure," printed from www.kaleidescape.com on Feb. 27, 2012, 9 pages.

(Continued)

*Primary Examiner* — Jeffery Williams
(74) *Attorney, Agent, or Firm* — Nixon & Vanderhye P.C.

(57) ABSTRACT

Distribution of content stored on read only media, and a system and method by which a consumer who purchased content stored on read only media implements a process in the field by which they alter the storage media. A system and tools are used by the consumer to identify, authenticate, disable, and confirm alteration in exchange for compensation, the acquisition of new usage rights to content, or the ability to restore access to or copy content to new media. The process may be conducted by the consumer in the field without assistance and or visual inspection, or be partially conducted in conjunction with an authorized intermediary. Furthermore, the process may restore access to content stored on new media without the need to transfer copies of content.

16 Claims, 35 Drawing Sheets

(52) U.S. Cl.
CPC ... *G11B 20/00884* (2013.01); *G11B 20/00927*
*(2013.01); G11B 2220/213* (2013.01); *G11B*
*2220/2537* (2013.01); *G06F 21/10* (2013.01);
*G11B 20/00847* (2013.01)

(56) References Cited

U.S. PATENT DOCUMENTS

| | | | |
|---|---|---|---|
| 5,316,464 | A | 5/1994 | Lexell |
| 5,320,219 | A | 6/1994 | Ward |
| 5,375,515 | A | 12/1994 | Morgan |
| 5,435,246 | A | 7/1995 | Edman |
| 5,504,688 | A | 4/1996 | Letourneau |
| 5,572,589 | A * | 11/1996 | Waters et al. ............... 705/58 |
| 5,787,802 | A | 8/1998 | McNab |
| 5,991,399 | A | 11/1999 | Graunke et al. |
| 6,302,176 | B1 | 10/2001 | Chen |
| 6,496,802 | B1 | 12/2002 | van Zoest et al. |
| 6,585,021 | B2 | 7/2003 | Clark |
| 6,747,930 | B1 * | 6/2004 | Weldon et al. ............ 369/53.21 |
| 6,799,621 | B2 | 10/2004 | Flynn et al. |
| 7,257,732 | B2 | 8/2007 | Zarnke et al. |
| 7,340,481 | B1 | 3/2008 | Baer et al. |
| 7,830,777 | B2 | 11/2010 | New |
| 2003/0028451 | A1 | 2/2003 | Ananian |
| 2004/0267742 | A1 | 12/2004 | Polson |
| 2005/0204019 | A1 | 9/2005 | Flynn et al. |
| 2006/0239155 | A1 | 10/2006 | New et al. |
| 2007/0105253 | A1 | 5/2007 | Hendriks |
| 2007/0150548 | A1 | 6/2007 | Nakagawa |
| 2007/0192352 | A1 | 8/2007 | Levy |
| 2007/0256141 | A1 | 11/2007 | Nakano |
| 2008/0071617 | A1 | 3/2008 | Ware |
| 2009/0257336 | A1 | 10/2009 | Knight |
| 2009/0259684 | A1 | 10/2009 | Knight |
| 2010/0088235 | A1 | 4/2010 | Chatfield et al. |
| 2010/0118674 | A1 * | 5/2010 | White et al. ............... 369/53.17 |
| 2010/0185729 | A1 | 7/2010 | Lord |
| 2011/0231273 | A1 | 9/2011 | Buchheit |
| 2011/0231941 | A1 | 9/2011 | Singer et al. |

FOREIGN PATENT DOCUMENTS

| | | |
|---|---|---|
| JP | 2005-257929 | 8/2006 |
| KR | 10-2007-0076748 | 7/2007 |

OTHER PUBLICATIONS

U.S. Appl. Nos. 12/082,123 & 12/316,409, Apr. 9, 2008 and Dec. 12, 2008.
Commonly-assigned U.S. Appl. No. 13/316,160 filed Dec. 9, 2011 (May 21, 2013 Restriction Requirement).

* cited by examiner

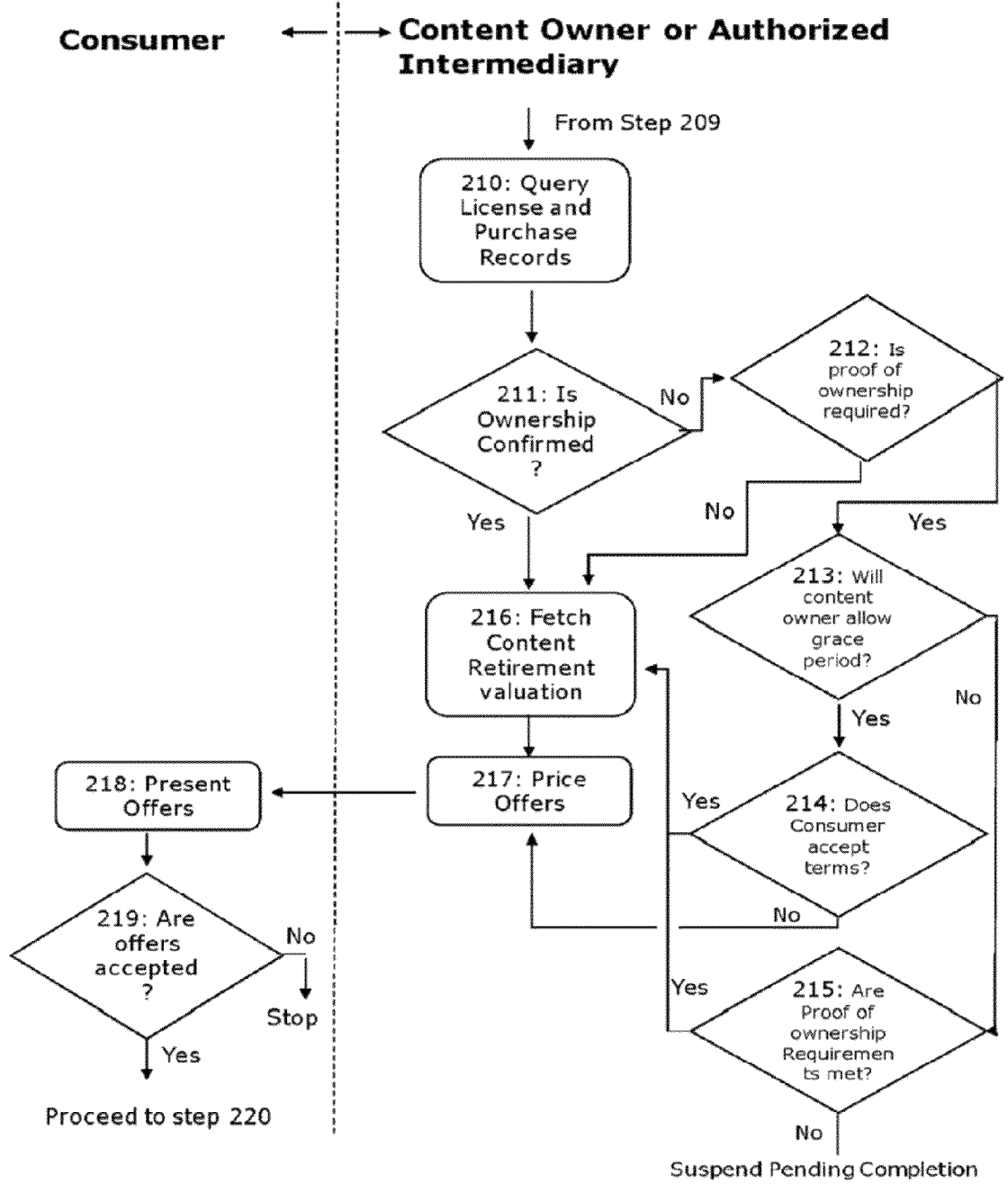

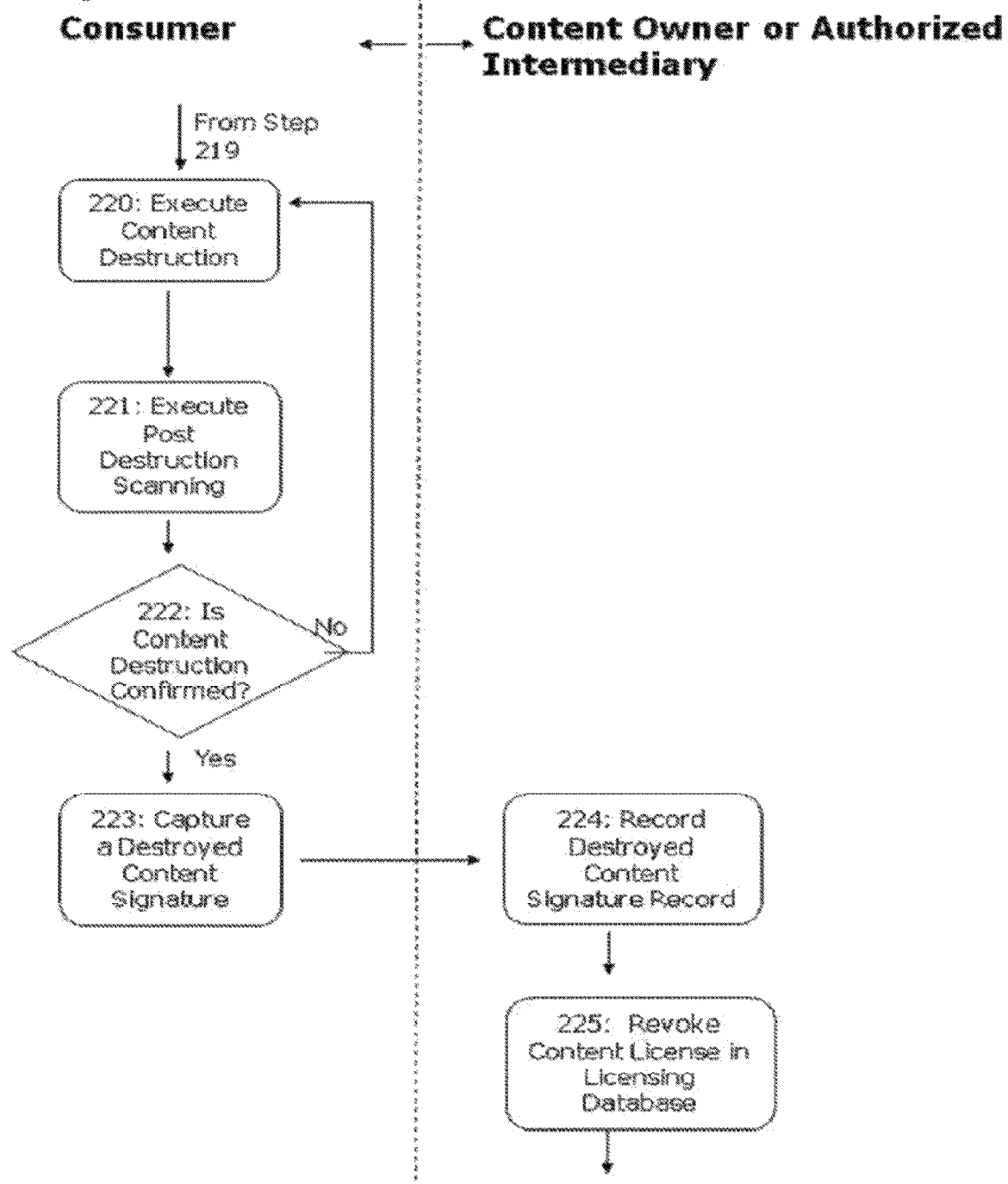

Figure 4A-4P Drawings and Operation of the Field Retirement Tool

Physical Dimensions of a DVD, Blu-ray, or CD disc per ISO spec
- 15mm I.D.
- 120mm O.D.
- 1.5mm thick Figure 4B: Region of media destruction:
- 53 to 110mm diameter Figure 4C: Pattern of media destruction:
- 81.5mm diameter circle
- 14.25mm offset from center of media

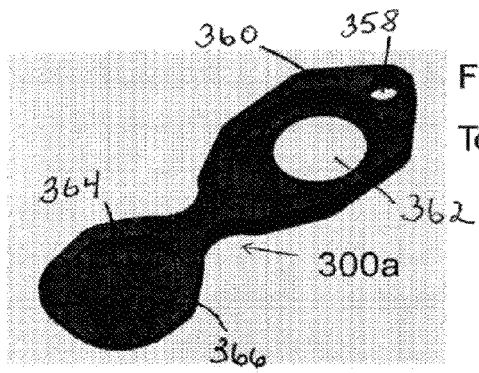
Figure 4D
Tool Base
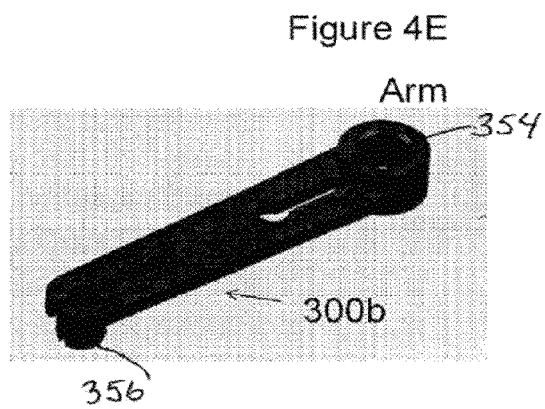
Figure 4E
Arm
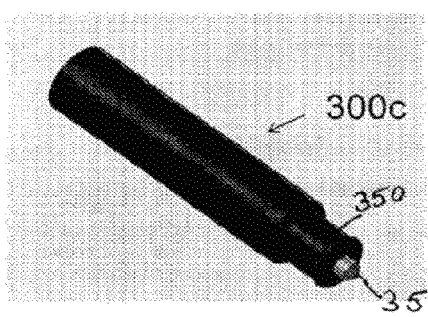
Figure 4F: Scribe (with metal tip)
Figure 4G: 3-Piece Tool Assembly
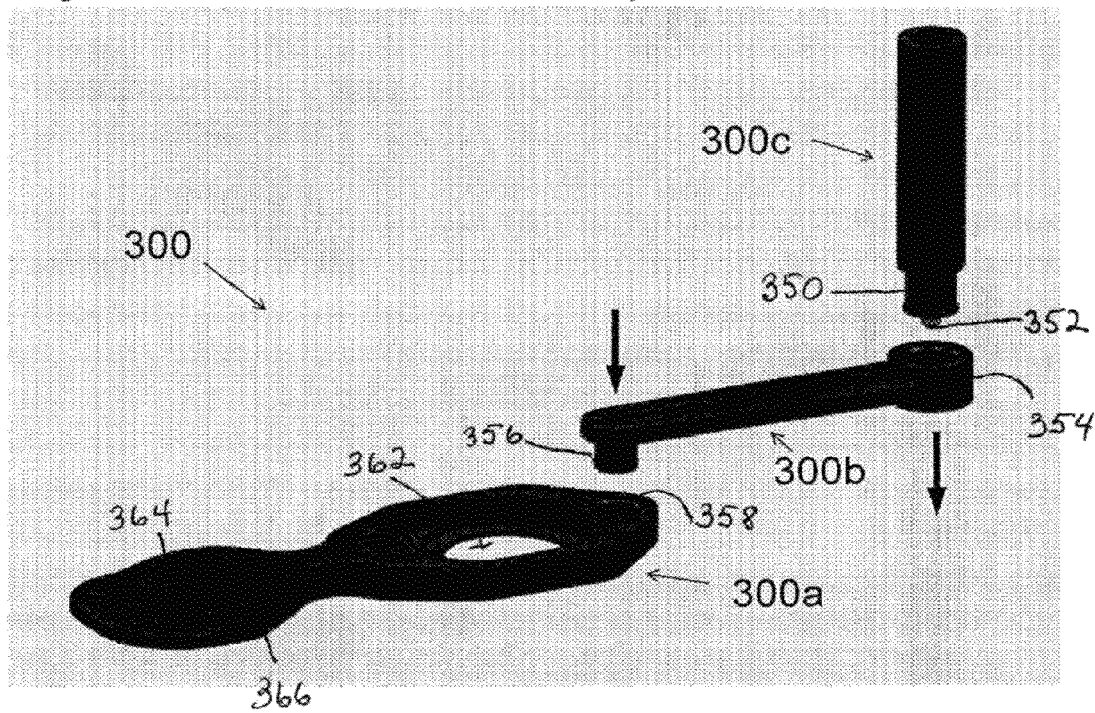

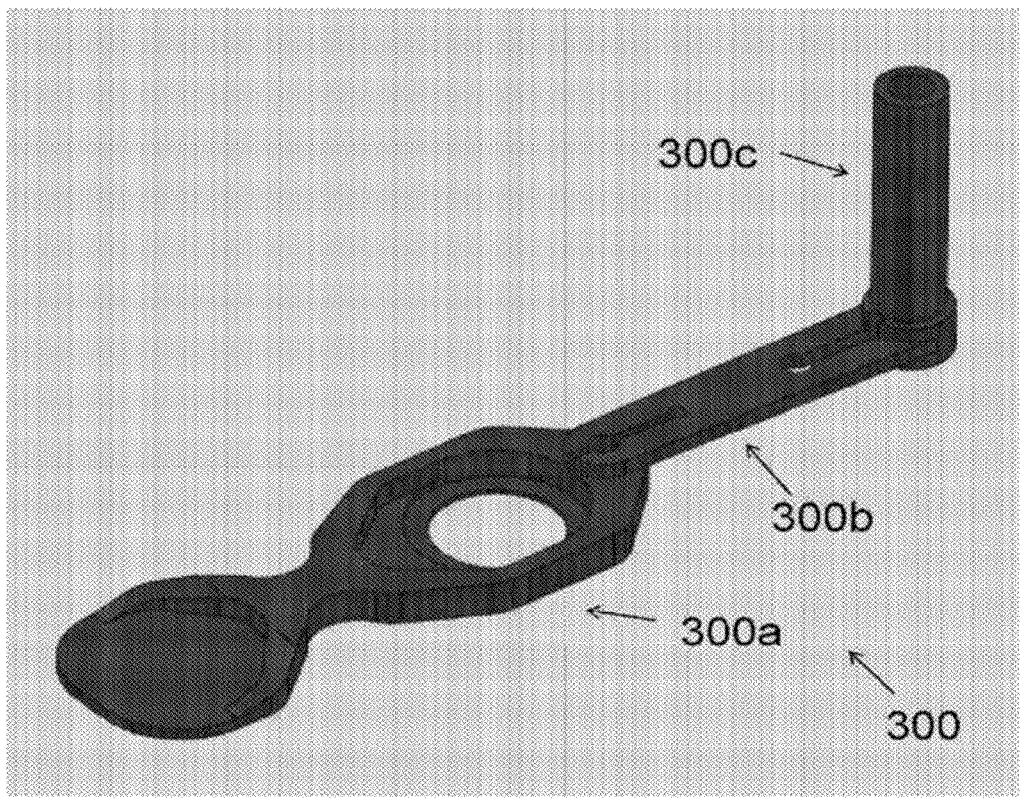
Figure 4H: Assembled Tool

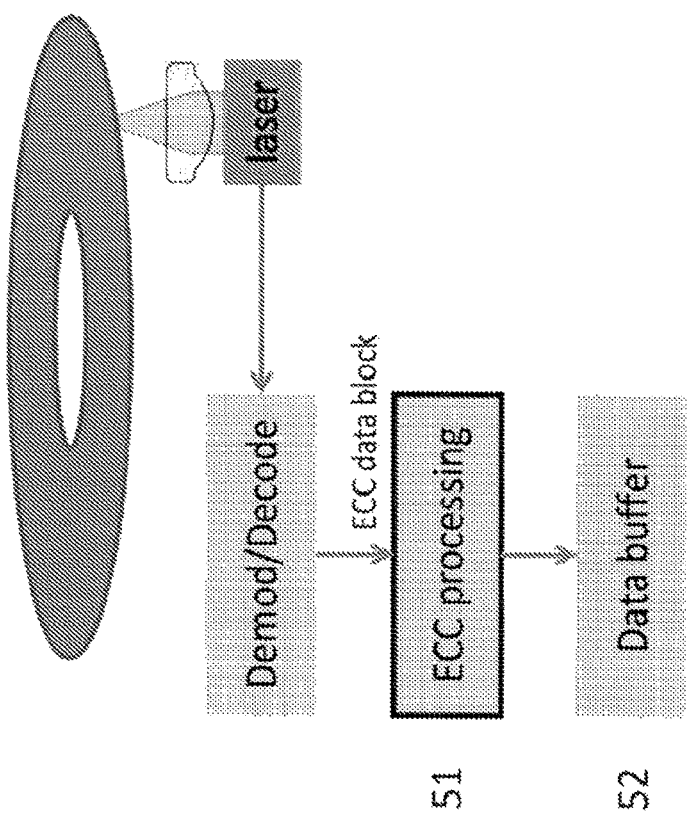
Fig 5: Optical disc signal processing data path
-- Prior Art --

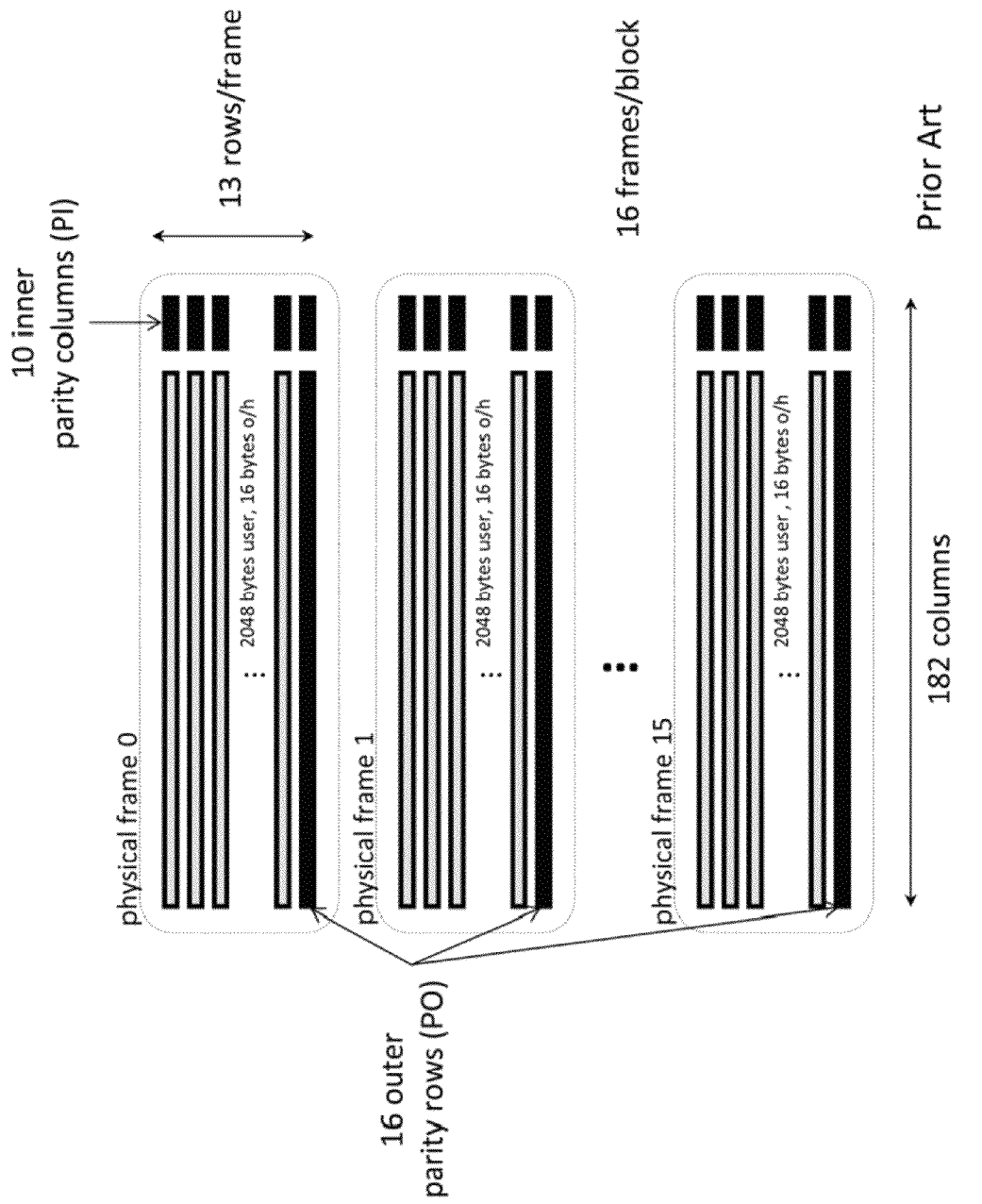
Fig 6: 37,856 byte physical ECC data block for DVD (32KiB user data)

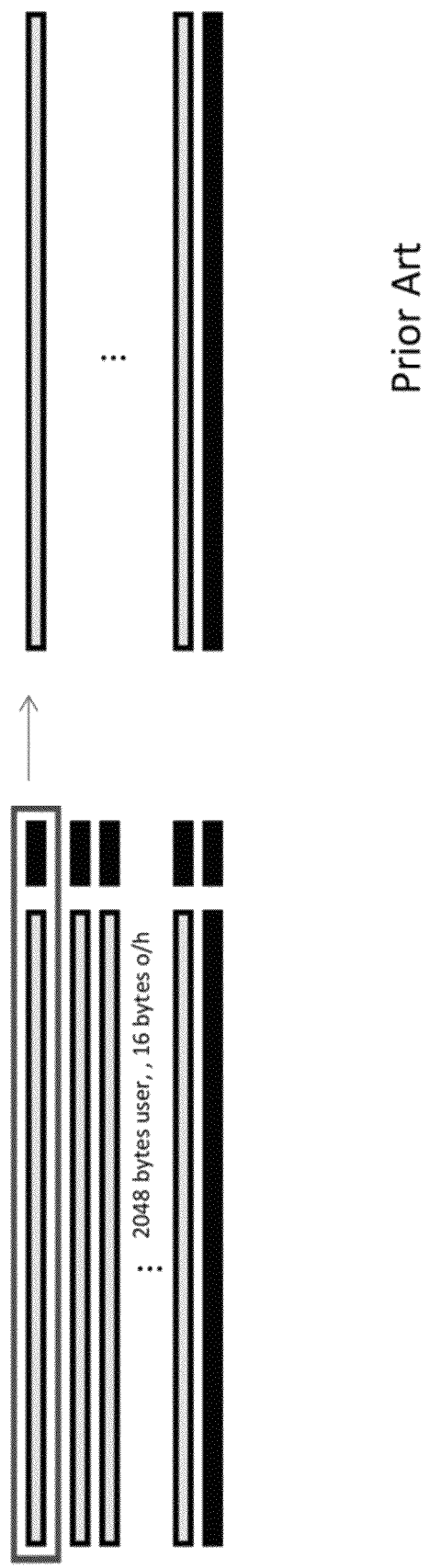
Fig 7: Row-wise PI error correcting

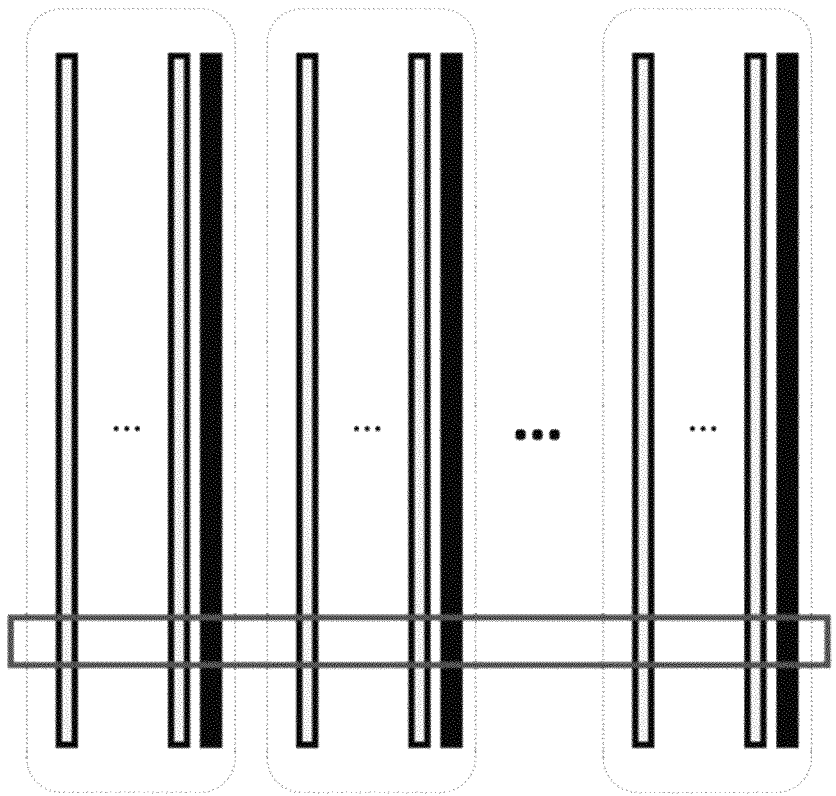
Fig 8: Column-wise PO error correcting
Prior Art

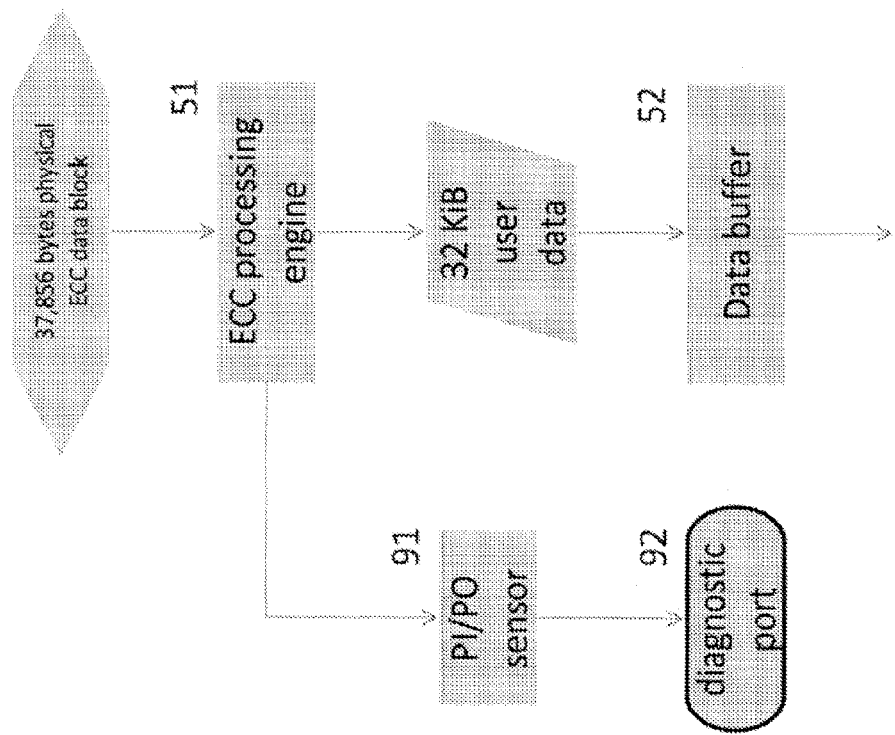
Fig 9: ECC sensor, PI/PO correction counts
-- Prior Art --

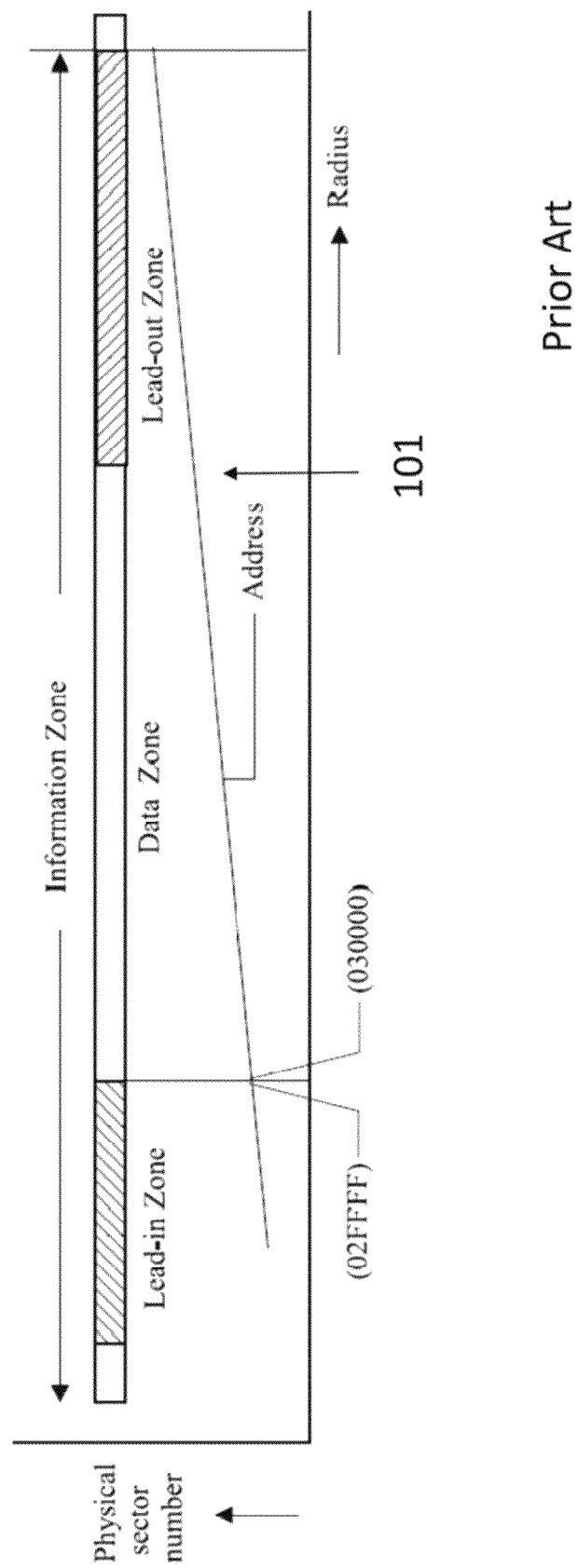
Fig 10: DVD Physical and Logical layout (from ECMA-267)

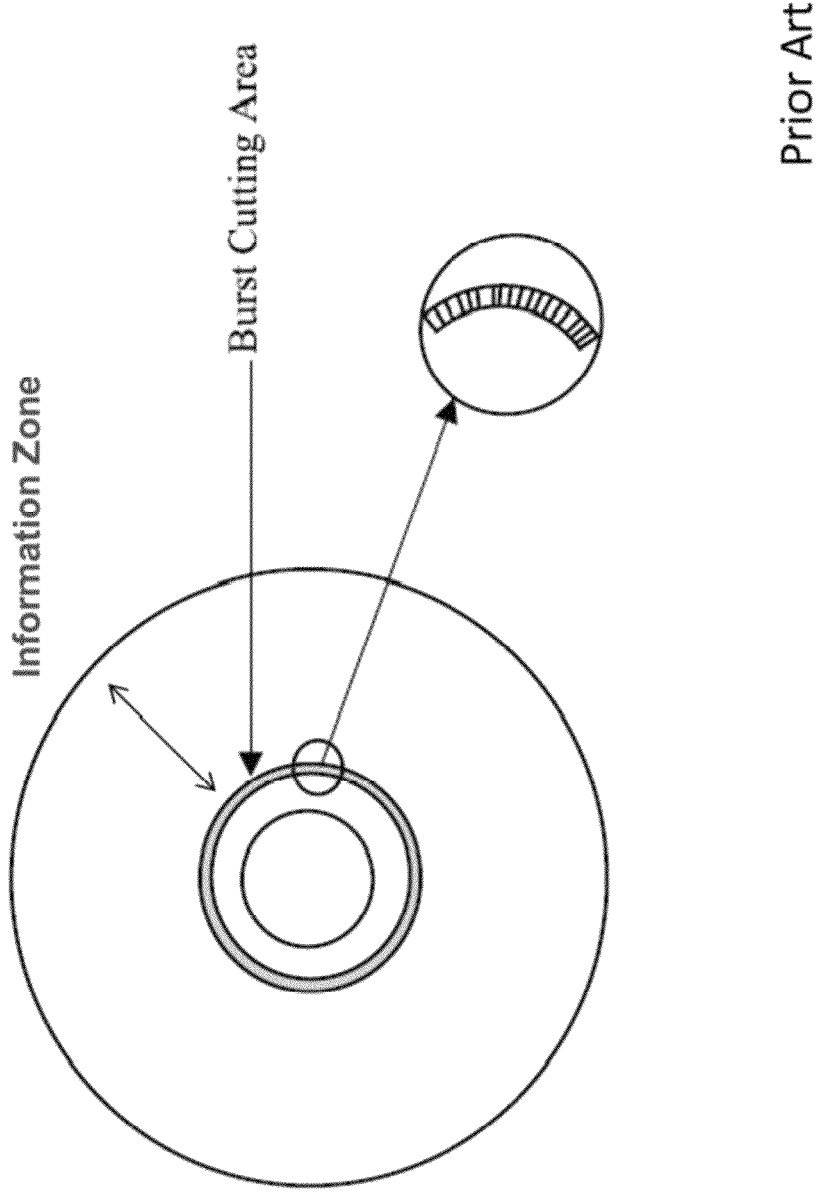
Fig 11: DVD Physical Zone Geometry (from ECMA-267)

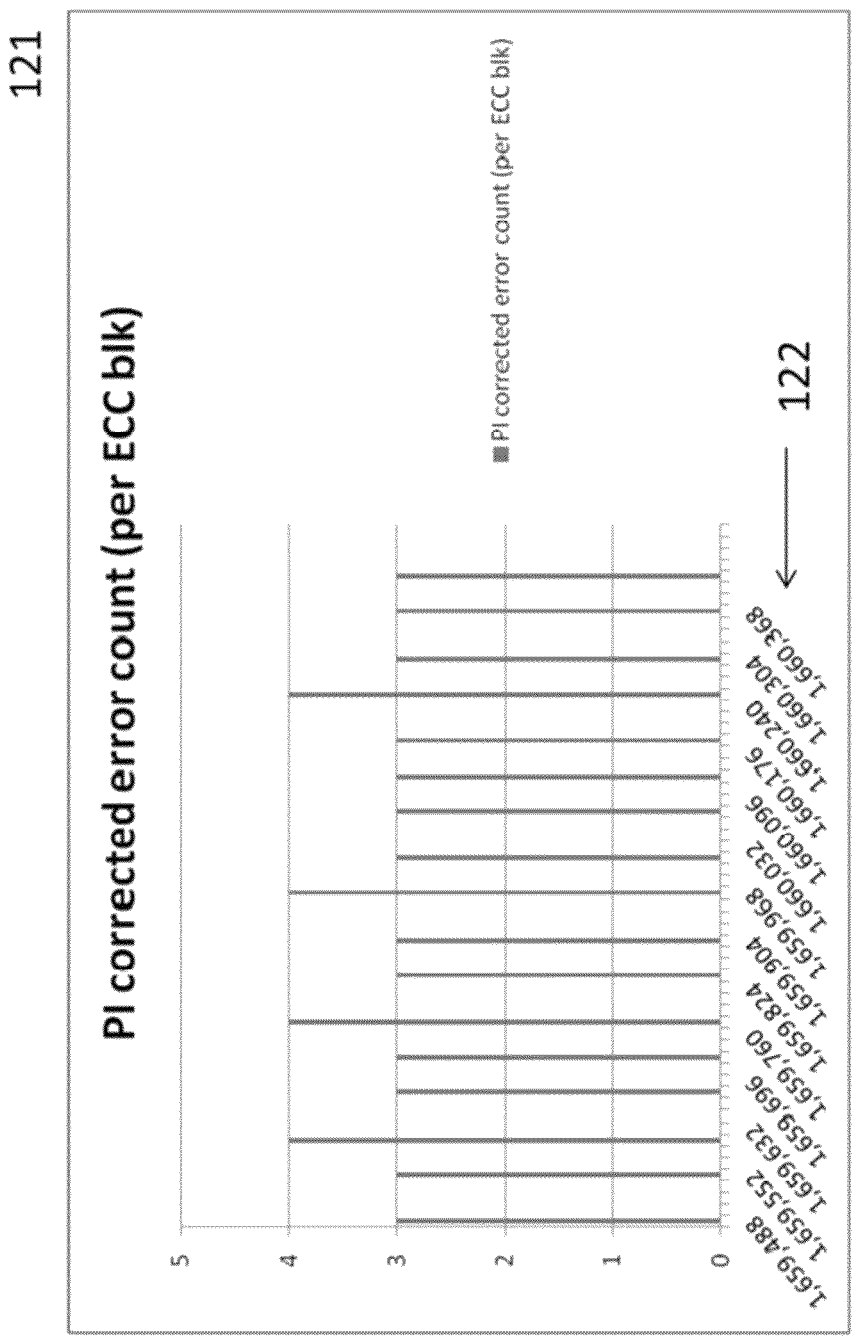
Fig 12: PI/PO sensor data via diagnostic port (flagged DVD)

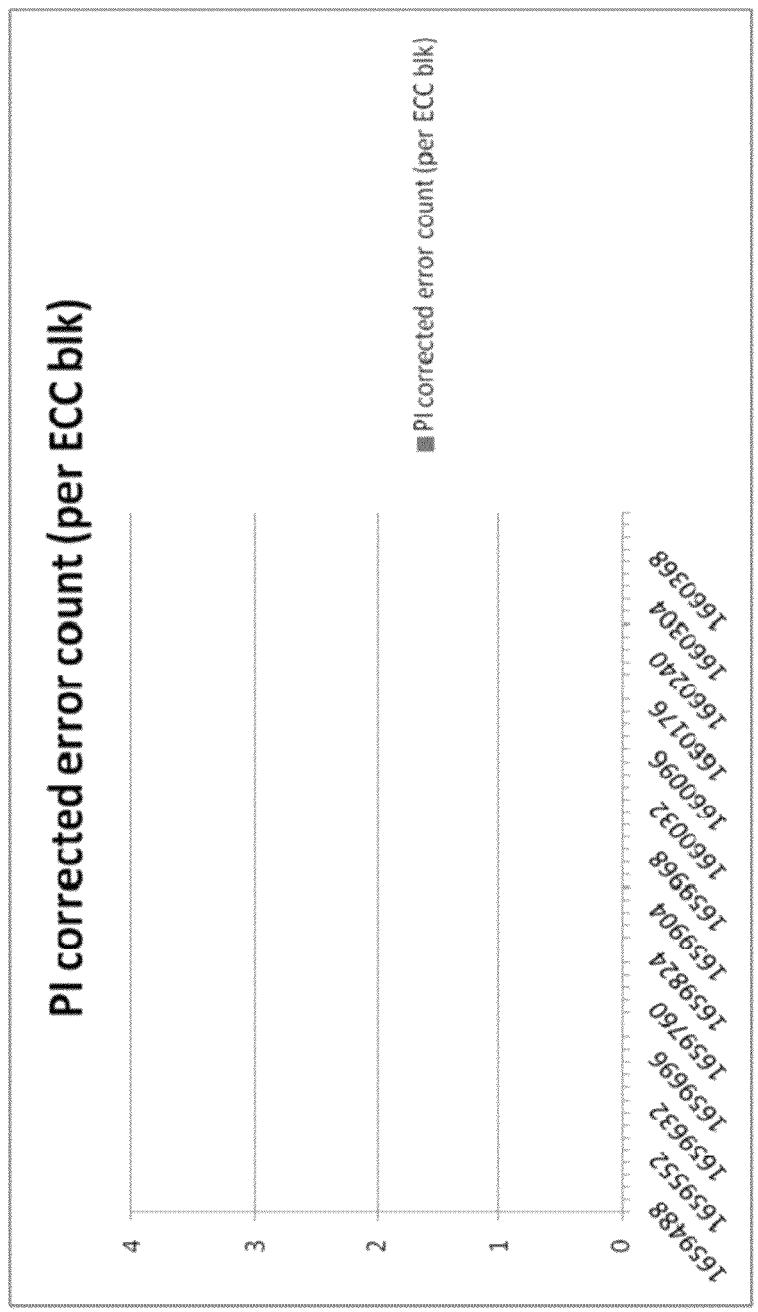
Fig 13: PI/PO sensor data (non-flagged DVD)

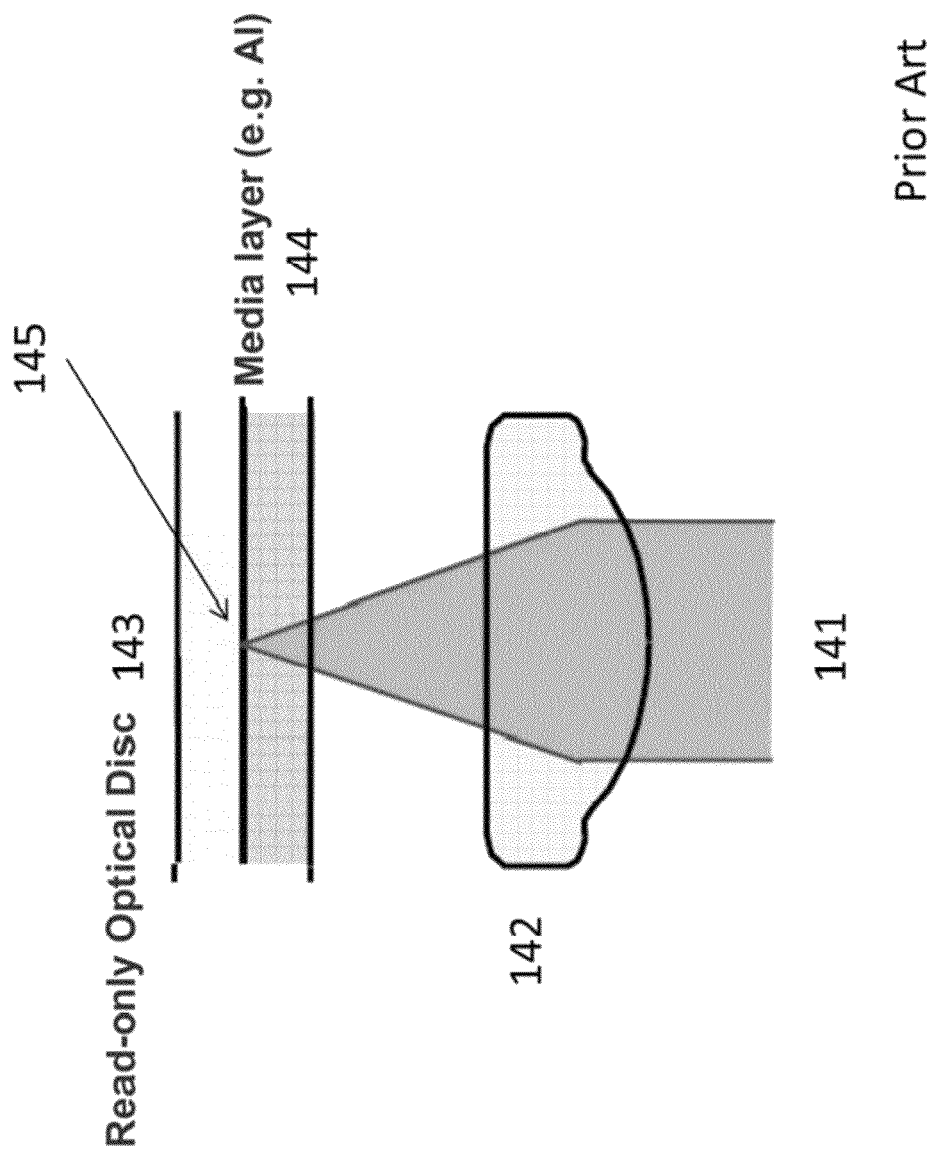
Fig 14: DVD Numerical Aperture Lens

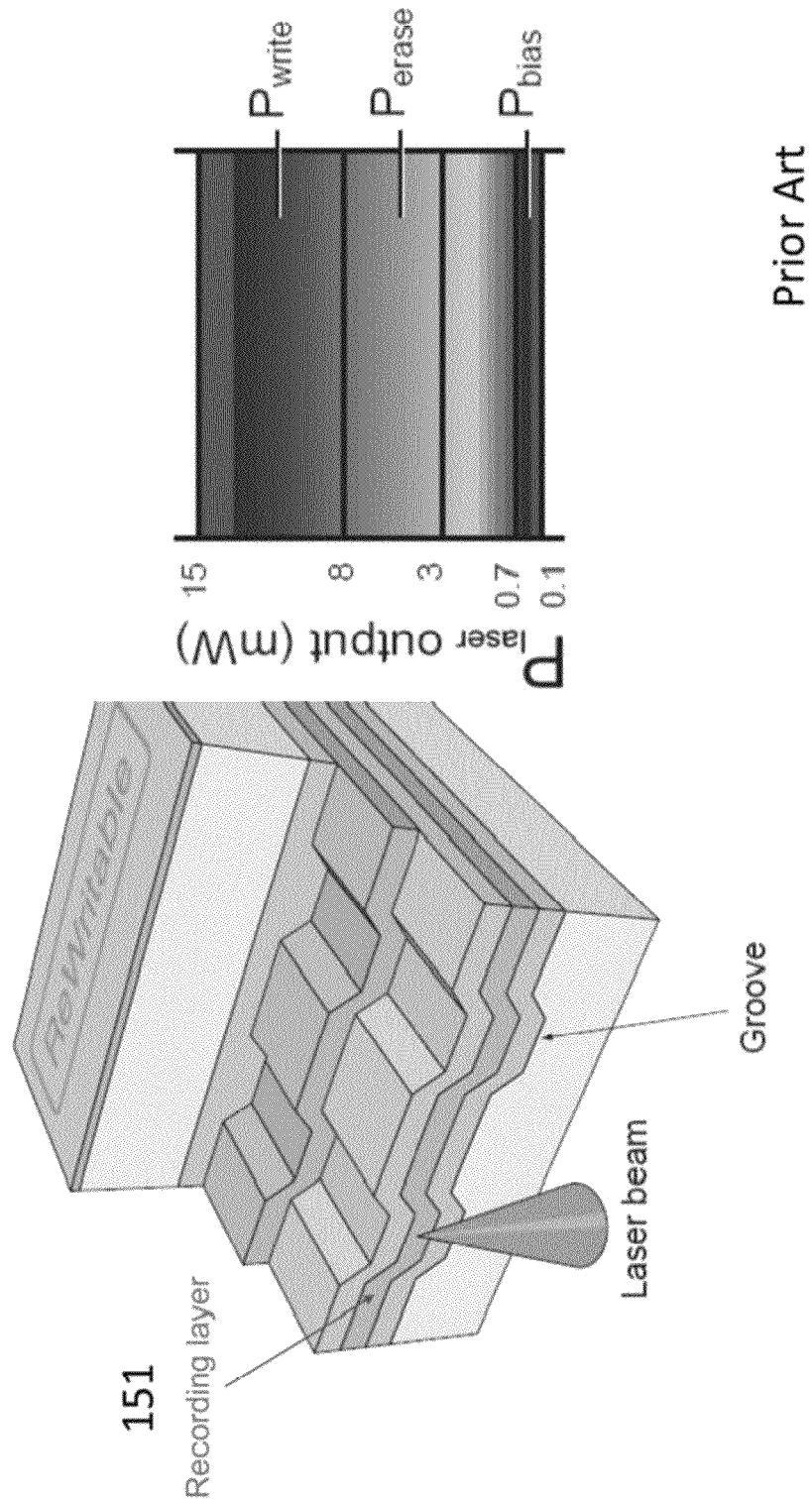
Fig 15: Rewritable Disc Laser Power

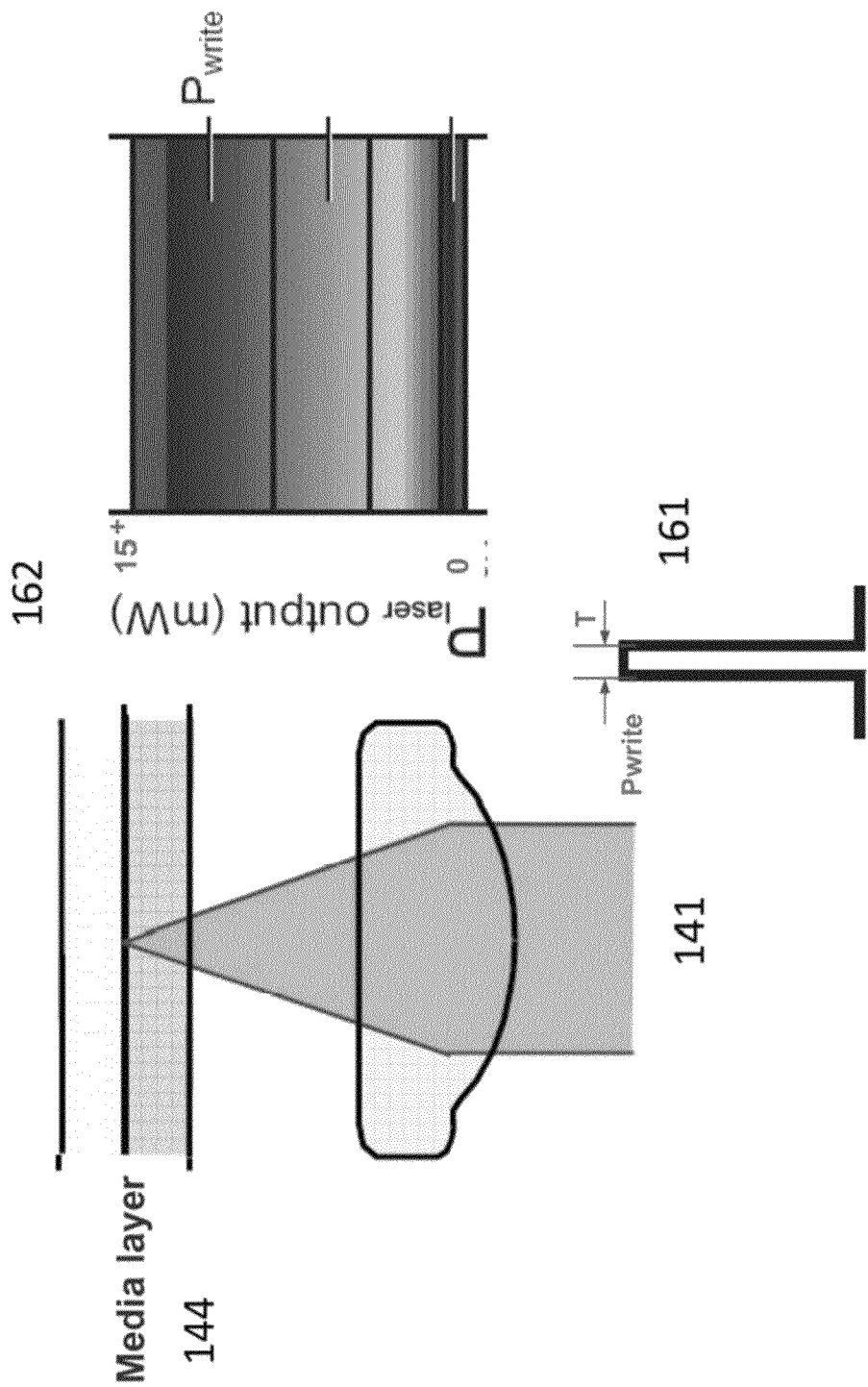
Fig 16: Writing a Flag on read-only media

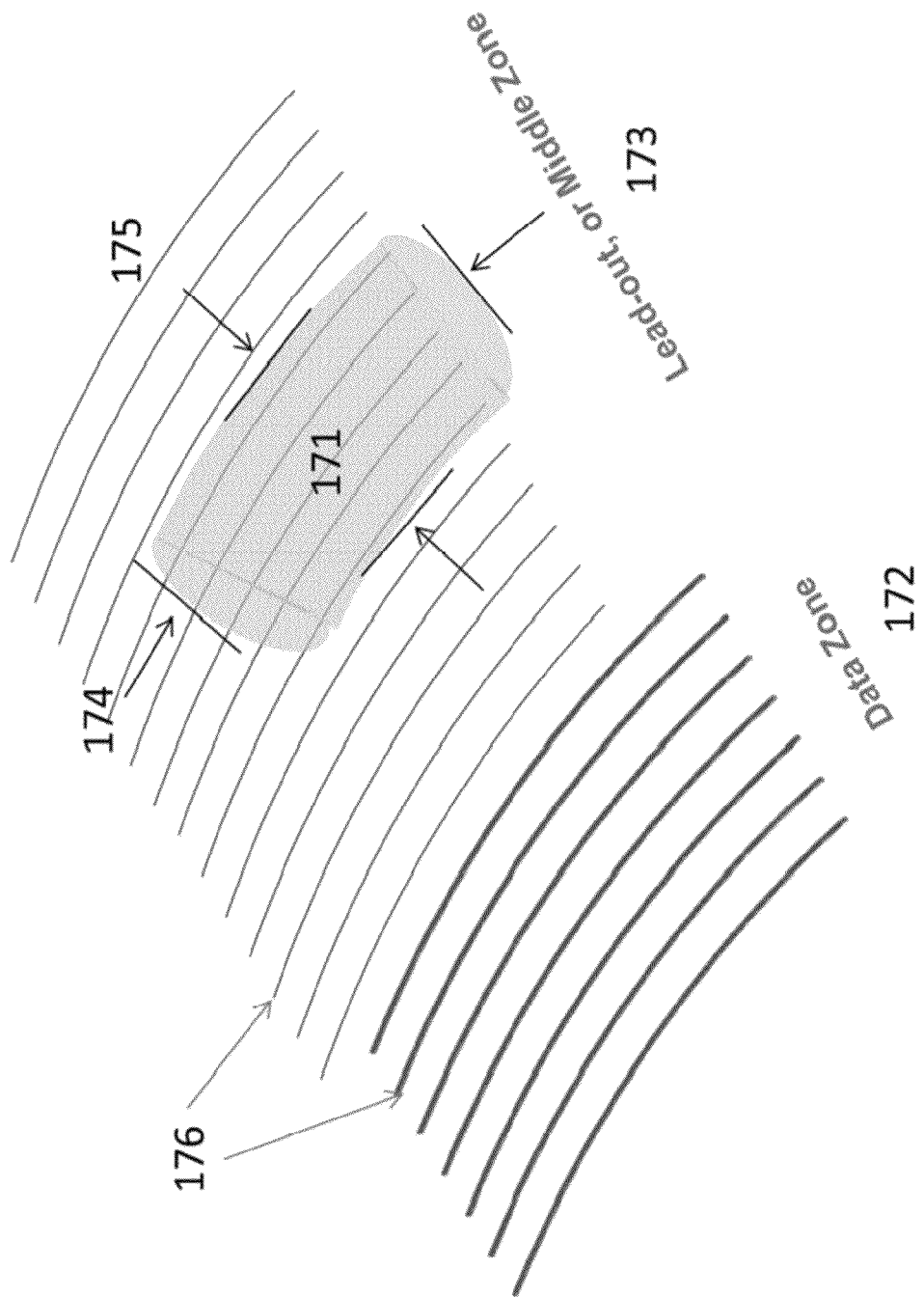
Fig 17: Flag shape and location example #1

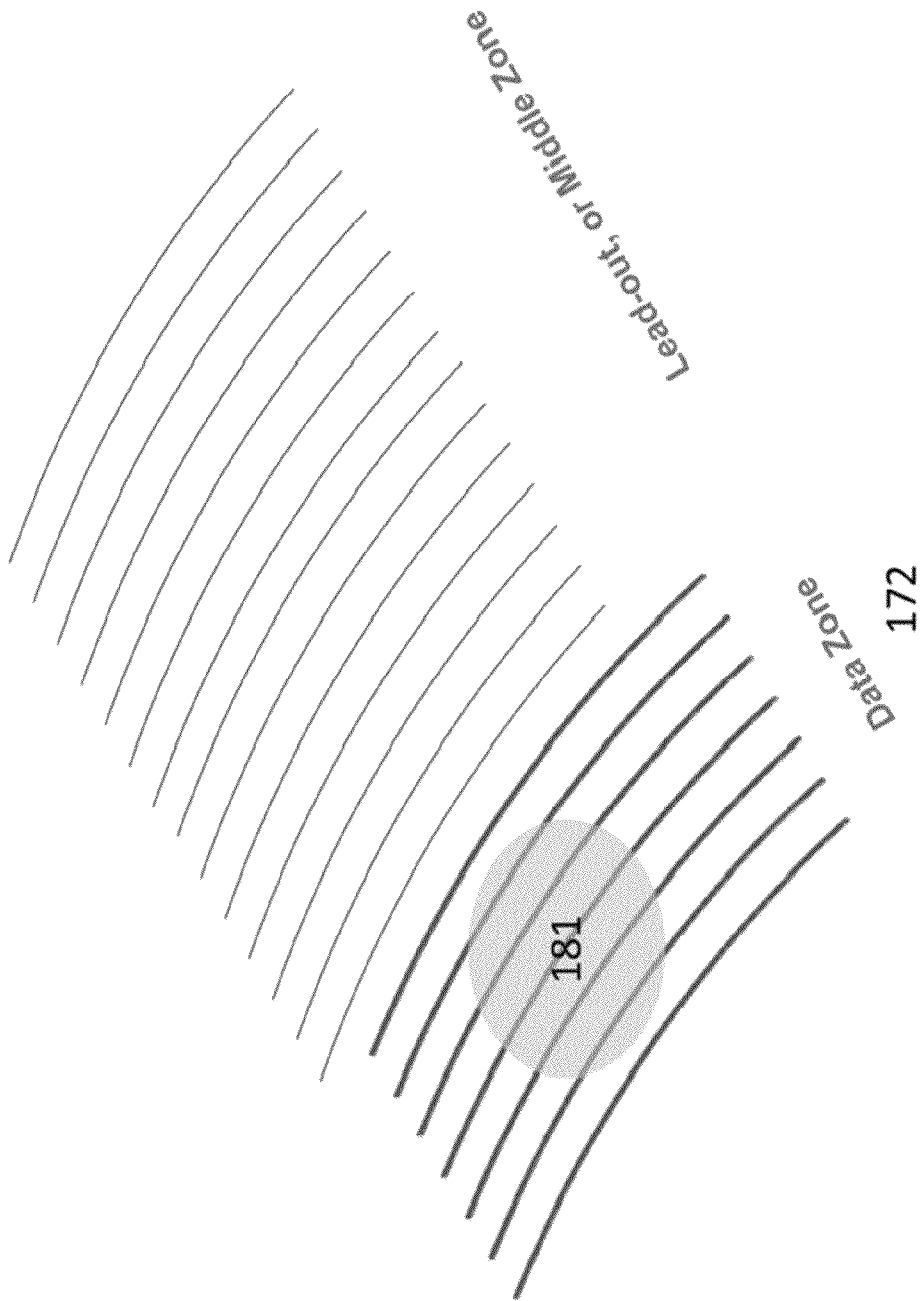
Fig 18: Flag shape and location example #2

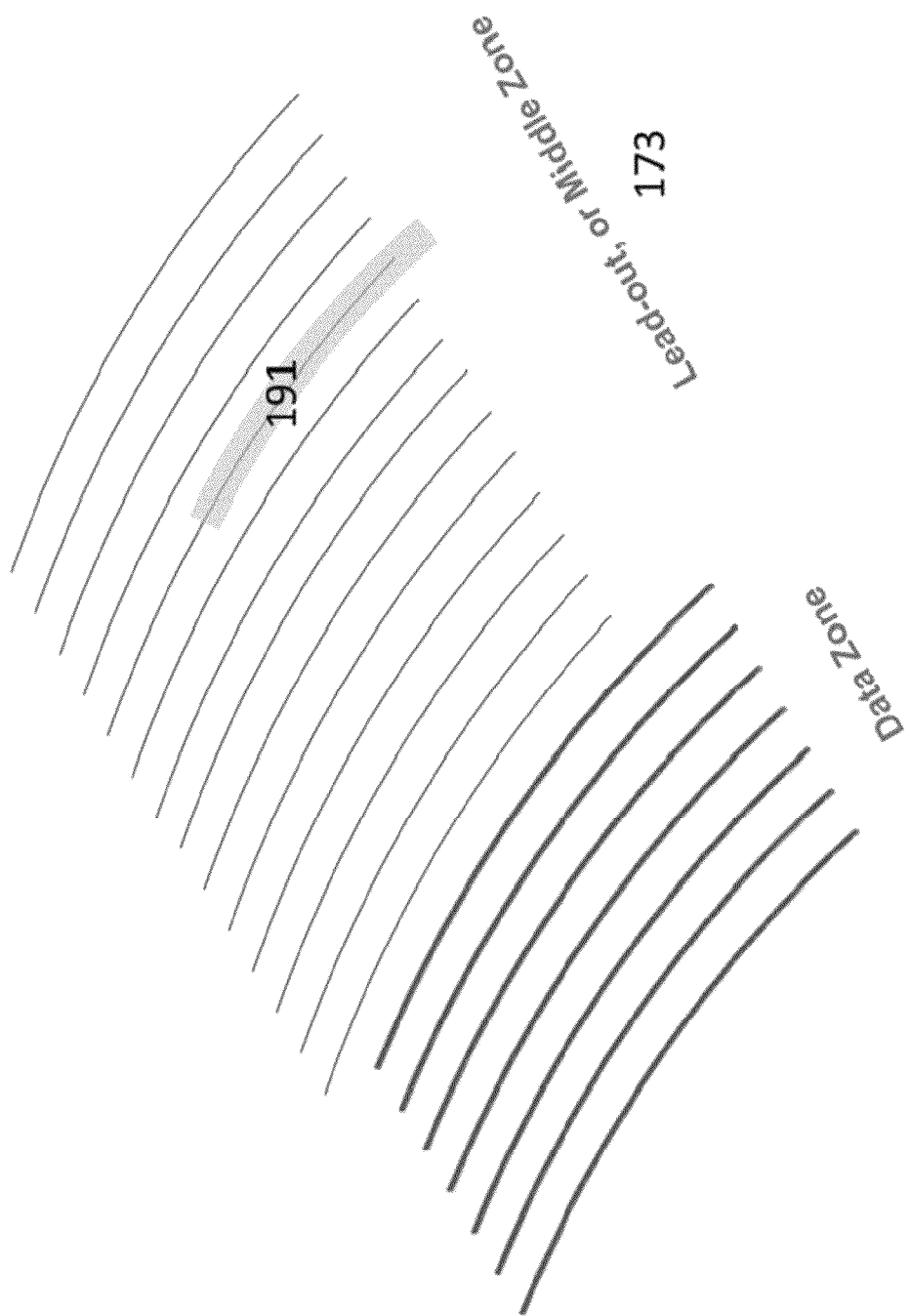
Fig 19: Flag shape and location example #3

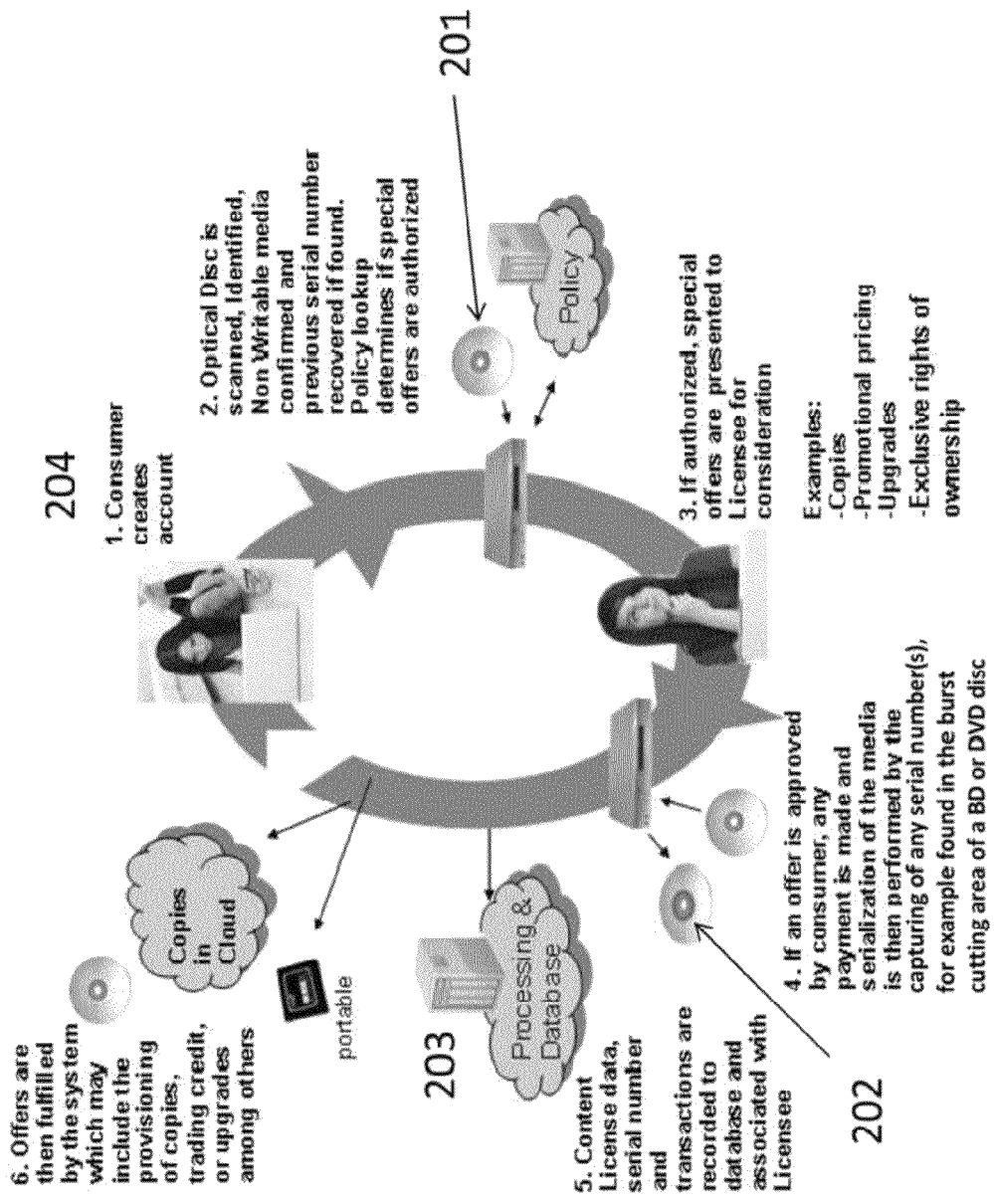
Fig 20: Capturing serial number data (e.g. BD media)

ELECTRONIC SYSTEM FOR THE PROTECTION AND CONTROL OF LICENSE TRANSACTIONS ASSOCIATED WITH THE ALTERATION OF REPLICATED READ ONLY MEDIA AND ITS BOUND LICENSED CONTENT

CROSS-REFERENCES TO RELATED APPLICATIONS

This application is a continuation-in-part of application Ser. No. 13/316,160 filed Dec. 9, 2011, which claims the benefit of priority from provisional application No. 61/421,444 filed Dec. 9, 2010. This application also claims the benefit of priority from provisional application No. 61/523,433 filed Aug. 15, 2011. Each of these prior applications is incorporated herein by reference.

STATEMENT REGARDING FEDERALLY SPONSORED RESEARCH OR DEVELOPMENT

FIELD

The technology herein relates to content rights protection and more particularly to systems and methods that manage and limit the recording and assignment of licenses from content stored on replicated, read only storage media. Still more particularly, the technology herein pertains to the process of placing as well as detecting the placement of marks or flags which can be used as part of a content management system.

BACKGROUND AND SUMMARY

While being relatively inexpensive to mass produce, content DVD's, Blu-ray discs, and CD's have limitations that have led to the growth of electronic distribution methods for content in the form of streaming media, downloads of digital files from a networked host and other techniques. As more content becomes stored and managed in the "cloud" and distributed as electronic files or streaming media, consumers who own licenses to content stored on physical media such as DVD's, Blu-ray, discs and CD's, seek the means to establish or record their ownership of these licenses and perform transactions that can move their rights to use the content to network-residing content and/or a new storage media; or they may seek the means to easily sell, trade-in, or transfer their license to a third party.

Example non-limiting illustrative technology herein provides a system and method that facilitates controlled licensing transactions for content bound to read only media by eliminating the need to physically deliver the content and its read only storage media container to the recipient, content owner, or authorized intermediary. Example non-limiting methods use digital equipment, digital networking, software and tools to identify, mark, optionally destroy and confirm destruction, create an audit trail, and account for any compensation given in exchange for the transaction. The illustrative process can be consumer implemented in the field at any location the consumer chooses, using digital equipment they operate. The illustrative process can be completed by the consumer without the need to involve a witness or third party to verify or attest to the transaction. Non-limiting examples of this equipment may include a suitably equipped personal computer, web tablet, DVD player, Blu-ray player, a portable media player, a suitably equipped High Definition television set, a home media server, and set top box, among others.

An example non-limiting system that enables the consumer to obtain valuable rights or compensation in exchange for implementing a process involving licensed content stored on physical media should also prevent and discourage fraudulent transactions. Without mechanisms to prevent fraud, an unscrupulous consumer could use any one of the several million DVD's or Blu-ray discs in circulation from rental stores, libraries, or friends and claim ownership of a license and its privileges. While maintaining the convenience of a location-independent and self-administered process, the illustrative non-limiting technology herein prevents and discourages fraud through the following mechanisms:

Rent/Borrow-Retire-Return: The fraud use case is described as a situation where the consumer has rented or borrowed a replicated DVD, Blu-ray, or Compact disc (CD) and uses it to claim ownership of a license, retire the disc in exchange for benefits or compensation, and then returns the disc to the rental store or source. The illustrative non-limiting method discourages fraud of this use case by marking the medium with a multi-level flag or other marking mechanism, and if desired, rendering the content unusable which would implicate the last holder of the disc thus making it less likely that the borrower or renter of the disc would attempt fraud. Furthermore, the alteration of the media can be made clearly visible to the naked eye and distinctive in its appearance so as not to not be confused with normal wear and tear. Making the disc conspicuously or recognizably marked and/or unusable through the placement of a distinctive and visible alteration of the media would make performing a Rent/Borrow-Retire-Return transaction unlikely.

Presenting a Copied Original: This fraud use case results from the consumer attempting to qualify for a licensing transaction by using a read/write or write once disc that stores a copy or image file of a replicated DVD, Blu_ray, or Compact disc (CD). The illustrative system prevents this type of fraud through the detection of read/write or write once media during the initial scanning and identification process. Any media detected as read/write or write once media is rejected and disqualified by the system and no licensing transaction is performed.

Presenting a Previously Retired Disc: This fraud use case results from the consumer attempting to qualify for a licensing transaction by using a previously retired or altered disc. In this example use case the system detects the altered media at the initial scanning and identification process and the media is rejected and disqualified from a licensing transaction.

Circulation of A Retired Disc: This fraud use case results from a retired and altered disc that is distributed to users who own or gain access to an unaltered and usable disc of the same content. The altered and retired disc is used to trick the system that the marking and, in some embodiments, destruction of the consumer's content, identified during the initial scanning process has been performed when in fact it has not, and in its place the consumer has substituted the previously altered and retired disc. The illustrative system has the capability to create a unique signature of the altered media properties and preserve a record of this signature in a data base. The method by which the unique signature is created can include the location of the marking and/or destruction of the content on the media, the shape of the alternation of the media, and/or information interpreted by the system as unique information from the inspection of the altered media. Prior to approving a licensing transaction, the system queries the signature database of retired discs and disqualifies any disc that has been previously recorded in the database. In addition to the measures used that examine and record marked and/or destroyed signatures prior to accepting the disc for a licensing transaction, the system may query a session record to determine if the alteration process has been completed within an acceptable time limit to ensure rental or borrowed discs are not scanned to await the future delivery of a retired or altered disc.

Circulation of a Fraud Set of Discs: A fraud set of discs is similar to the circulation of a retired or altered disc with the exception that consumer does not have possession of a usable copy of the content and media. Instead the consumer gains access to set of discs where one is a usable copy and the other is a marked and/or destroyed copy of the same content. The consumer uses this set of discs to qualify for a licensing transaction, then circulates the "Fraud Set" to other consumers who do the same. As described with the circulation of a retired disc use case, the system records a unique signature of the properties of the retired disc in a data base, and confirms that the same retired disc has not been used in a previous licensing transaction prior to approving a new licensing transaction.

Altered Retired Discs: This fraud use case results from the consumer attempting to reuse a previously retired disc by modifying its previous alteration or destruction pattern so as to create a new unique signature on the previously retired disc. The illustrative method would prevent this fraud use case through the identification of an invalid shape or alteration pattern, or in the case where alterations are made by a powered mechanism, a lookup of the disc signature from less visible minute alterations made on the disc media which would indicate the disc had been reused. Less visible and minute alterations of the media are difficult for the consumer to modify thus significantly lowering the risk of this fraud.

The example non-limiting measures taken by the illustrative non-limiting system to prevent fraud are scalable in their robustness and controlled by the online system and its policy management component. Thus the licensor may adjust the level of fraud protection from none to robust measures as warranted by business conditions. The policy management system controls the level of security in accordance with criteria that may include a time schedule from initial release of the content, market value of the content, or other criteria.

A non limiting example of content follows: This disclosure describes a system and method for the recording and management of licenses for content stored on replicated, read only, storage media. The term "content" is often but not exclusively used to refer to the recordings made of a creative work, performance, or composition so that the creative work may be replicated, distributed and output on a device for mass consumption. Technology is used to capture and record creative works for future consumption. Technology may capture and render a creative work as an analog waveform or digitize the creative work into a digital file. Non-limiting examples of creative works may include movies, musical performances, audio books, television shows or programs, music videos, and photographic images, among others. Content is commonly replicated as analog recordings or digital files, bound to a storage medium, and distributed as packaged goods for retail sale. A few examples of these products include Digital Versatile Discs (DVD's), Blu-ray Discs (BD's), Compact Discs (CD's), or audio recordings on Records or LP's.

DVD's, BD's, CD's, and Records contain analog recordings or digital files of the content that can not be erased or deleted from the substrate by playback devices. When content is stored on a substrate that does not have the capability to erase or delete the content, its storage media is referred to as Read Only Media or ROM. Since content files bound to read only media can not be overwritten or deleted by the media playback device, a process by which a consumer seeks to move, retire, lend, trade, or sell content bound to a DVD, BD, CD, or Record disc, may require the consumer to deliver or send the DVD, BD, CD, or Record to the recipient.

The term "content owner" should not be in many or most cases confused with a consumer who purchases packaged goods such as DVD's or CD's. A significant portion of content that is used by consumers is composed of copyrighted material that is licensed for the private use of the purchaser of the packaged goods in which a copy of the content is stored. For example, when a consumer purchases a DVD of a movie, he does not purchase the actual content but instead is buying a license to use, play and privately perform the content. Ownership of the content remains with the content owner, or rights owner, who owns a controlling interest in the content itself. When content is licensed for use, the owner of the content is typically referred to as the licensor and the purchaser of the right to use the content is typically referred to as the licensee. In many cases, when packaged storage media containing content is sold to a consumer, the content owner is licensing the right for the consumer to use a single copy of the content stored on physical storage media for private, non commercial use. Thus a system that enables the consumer to cancel, transfer, or sell his license to use the content, should ensure the consumer no longer has use of, control, or possession of any licensed copies of the content prior to completing any transaction that cancels his license.

Content is commonly replicated as analog recordings or digital files, bound to a storage medium, and distributed as packaged goods for retail sale. Typically these packaged goods are mass produced and replicated without serialization or other means to identify and track each unit of production and record its ownership with the licensee. Thus, licensing transactions involving the transfer of the licensee's rights to use the content to a third party or to new storage or other form of the media for use by the same licensee typically requires the licensee to physically surrender the physical media and stored licensed content to a recipient, service bureau or other trusted depository prior to completing the transaction.

Shipping or delivering content stored on DVD's, BD's, CD's or Records to a recipient is a time consuming, tedious and expensive process that many consumers would choose to avoid. DVD's, BD's, CD's, and Records do not fit in standard size envelopes so special shipping mailers must be found and purchased. Alternatively, several discs may be packed in a box and shipped, however; packaging and delivering the content to the shipper is inconvenient. DVD's, BD's, CD's, and Records may be damaged or lost in shipment resulting in a complete loss to the licensee. Furthermore, both of these methods require someone to pay for the shipment which reduces the proceeds of the transaction, thus making commerce in content trading less attractive.

Once shipped, the DVD's, BD's, CD's, and Records must be received and processed by the content owner or authorized intermediary. The labor associated with handling, accounting for, and disposing of returned DVD's, BD's, CD's, and Records creates significant costs that deplete the residual valuation available to the consumer for the trading or commerce of their DVD's, BD's, CD's, and Records. Furthermore, the expense of processing returned DVD's, BD's, CD's, and Records lowers profit margins for the content owner or their agent, making the business less attractive and increasing costs to the consumer.

When used in support of a licensing transaction, a retirement of DVD's, BD's, CD's, and Records can be used to offset the purchase price of new rights or licenses. For example, compensation given for the retirement of a license may be used to purchase new content licenses packaged on ROM media such as DVD's, BD's, or CD's or content packaged in digital files that are distributed online. Licenses need not be limited to the purchase of new content or trade ins however; but may be used to allow new privileges for the use of original content. For example, the right to move the original content to a new storage media or location, create additional copies of the original content, or the right to convert the original content to higher quality (e.g. SD to HD) or new format (e.g. 2D to 3D), are rights that may be purchased that enhance the rights associated with the original content. When rights are offered for sale and use of content they are referred to as Rights Offerings or Licenses.

Retirement in one non-limiting example is a process by which a consumer who purchased content bound to read only storage media, voluntarily disables the media and its stored content to a level deemed sufficient by the content owner, so that the use of content that was originally stored on media does not remain with consumer, or so it could not be used by another consumer or entity. Retirement allows the consumer to surrender their ability to access and use the content in its original physical form in exchange e.g. for compensation, the transfer of the right to a third party, as a condition of receiving new rights or privileges by a content owner or their authorized intermediary, or for other purposes.

When used in support of a trade-in transaction, a retirement can be used to offset the purchase of new rights or licenses. For example, compensation given for the retirement of a license may be used to purchase new content licenses packaged on ROM media such as DVD's, BD's, or CD's or content packaged in digital files that are distributed online. Licenses need not be limited to the purchase of new content or trade-in's however; but may be used to allow new privileges for the use of the original content.

The preceding discussion is provided for general background information and it is not intended to be used to assist in the determination of the scope of the claimed subject matter.

NON LIMITING ILLUSTRATIVE EXAMPLES

In one non-limiting illustrative example, a consumer retires and receives value for the retirement of a DVD of a movie title by using a special tool, an internet connected device such as a personal computer or media player, and an online account established by the content owner or their authorized intermediary. In this exemplary embodiment, the consumer creates a secured trading account with the content owner or authorized intermediary, software is downloaded and installed on the consumer's device, and a retirement tool is sent to the consumer to assist in the destruction of the DVD. The DVD is placed in the optical drive of the consumer's device, scanned for properties, and identified as a valid stock keeping unit of a DVD offered in commerce by the content owner's online system. The consumer accepts an offer to retire the DVD, and uses the retirement tool to destroy the content on the DVD at a level to make the DVD valueless, yet still identifiable by the system. The destroyed DVD is rescanned, re-identified, and its unique post destruction properties are recorded in a database. Once the system has confirmed the DVD has been sufficiently destroyed, the online system records the destruction of the DVD, and revokes or records the consumer's license to use the DVD in a licensing database. At the discretion of the content owner, the consumer's account may be immediately credited for the retirement value of the DVD, or credited following a verification period. The verification period may require the consumer to place the destroyed DVD back into the optical drive of their device for a rescan at a future date to provide an added level of assurance that the original DVD was not obtained from a DVD rental business or other third party. The content owner or their authorized intermediary maintains a record of the destroyed DVD signature for auditing purposes. The consumer's trade credit that is established following the successful completion of the retirement process may be used for a variety of offerings at the discretion of the content owner or their authorized reseller. A partial list of non-limiting examples of this use may include credit against the purchase of a digital download file of a different motion picture title, the purchase of a new movie title on DVD or BD disc, the purchase of a movie rental, credit against a subscription fee, the purchase of additional copies, or the purchase of a digital file to a motion picture stored on recordable storage media.

In a second illustrative non-limiting example, a consumer uses the system and method to support the exchange or sharing of content with another consumer. In this exemplary example, the original purchaser of the content seeks to transfer their usage rights to another individual. The purchaser of the content uses the same system and tools to identify, destroy, and retire their content. However, instead of receiving credit for the retirement of the content, the license for the use of the content is transferred to another individual.

In a third illustrative non-limiting example, a content owner or their intermediary may not require the destruction of the content, however; they may use the system to automate the identification of content and the presentation of offers to the holder of the content.

In a fourth illustrative non-limiting example, a consumer uses the system and method to virtually move content stored on a read only optical disc media to an internet computer data center or host. The consumer uses the system and method to electronically scan and confirm the original storage media is replicated read only media, and to identify the content stored on the original read only storage media. If acceptable media and content is identified, the consumer is presented with an offer to transfer their use of their content from the original read only storage media to new storage media residing at the internet host. If the consumer accepts the offer, he uses the Field Retirement Tool to alter the original storage media to render a significant portion of the content stored on the original storage media unusable. The original storage media is then rescanned electronically to confirm the alteration of the original storage media has rendered the content sufficiently unusable, and when this state has been confirmed and any compensation requirements satisfied, a license record is approved for a right to use content stored on new storage media controlled e.g. by the internet host.

In a fifth illustrative non-limiting example, a consumer uses the system and method to virtually move content stored on a read only optical disc media to an internet or other networked computer data center or host or the like. The consumer uses the system and method to electronically scan and confirm the original storage media is replicated read only media, and to identify the content stored on the original read only storage media. If acceptable media and content is identified, the consumer is presented with an offer to transfer his use of their content from the original read only storage media to new storage media residing at the internet host or otherwise on the network. If the consumer accepts the offer, he uses a powered mechanism to alter the original storage media to render a significant portion of the content stored on the original storage media unusable. The original storage media is then rescanned electronically to confirm the alteration of the original storage media has rendered the content sufficiently unusable, and when this state has been confirmed and any compensation requirements satisfied, a license record is approved for a right to use content stored on new storage media e.g. controlled by the internet host.

In a sixth illustrative non-limiting example, a consumer uses the system and method to virtually move content stored on a read only optical disc media to new storage media located anywhere. The consumer uses the system and method to electronically scan and confirm the original storage media is replicated read only media, and to identify the content stored on the original read only storage media. If acceptable media and content is identified, the consumer is presented with an offer to transfer their use of their content from the original read only storage media to new storage media residing at the internet host. If the consumer accepts the offer, he uses the Field Retirement Tool to alter the original storage media to render a significant portion of the content stored on the original storage media unusable. The original storage media is then rescanned electronically to confirm the alteration of the original storage media has rendered the content sufficiently unusable, and when this state has been confirmed and any compensation requirements satisfied, a license record is approved for a right to use content stored on new storage media controlled by the internet host.

In a seventh illustrative non-limiting example, a consumer uses the system and method to virtually move content stored on a read only optical disc media to new storage media located anywhere. The consumer uses the system and method to electronically scan and confirm the original storage media is replicated read only media, and to identify the content stored on the original read only storage media. If acceptable media and content is identified, the consumer is presented with an offer to transfer their use of their content from the original read only storage media to new storage media residing at the internet host. If the consumer accepts the offer, they use a powered mechanism to alter the original storage media to render a significant portion of the content stored on the original storage media unusable. The original storage media is then rescanned electronically to confirm the alteration of the original storage media has rendered the content sufficiently unusable, and when this state has been confirmed and any compensation requirements satisfied, a license record is approved for a right to use content stored on new storage media controlled by the internet host.

In an eighth illustrative non limiting example the system and method are used to confirm content stored on replicated read only media has been rendered sufficiently unusable in support of transactions that do not compensate the licensee of the content. Non limiting examples include the recycling or disposal of the media and content license, the confirmed altering and impairment of storage media to render content unusable associated with the donation of a license, the confirmed altering and impairment of storage media to render content unusable to avoid the cost of return shipment of the storage media and content.

In an additional example non-limiting embodiment, an example system and method utilizes the alteration of data and/or correcting codes which can be found in an ECC (error correcting codes) subsystem typically found in many modern optical disc drives such as DVD, CD, and Blu-ray Disc devices. In this non-limiting embodiment, marks can be placed onto the disc surface, or into sub-layers below the surface, and in specific locations so as to alter some or all of the codes of the ECC system nearby the mark. In this example, the controlled mark placement can be done in such a way as to alter only a sufficient number of ECC codes and/or content data such that the error correction system can correct for the alteration while at the same time remains parametrically identifiable as a flag on the media. In this embodiment, ECC parametric sense information can be characterized to automatically determine if the media under test has been duly flagged, or not. Further, in this embodiment, the media would have been flagged in a non-fully destructive manner. That is, the alteration of content on the media is such that the ECC system and other error tolerant systems such as the content decoder subsystem (e.g. MPEG2), are able to correct for such minor alterations, resulting in such a way that the media remains operable, the content remains playable in a typical playback device.

In another example non-limiting embodiment, flags can be placed into the media automatically, by way of automated means which may be found in typical optical disc devices, or by modified means in such devices. As a useful example, this example non-limiting embodiment proposes the use of a write laser, found in a typical writable DVD drive, to be applied in an unconventional way, to alter data and/or correcting codes to automatically place one or more flags onto or into the media. As shown in the previous embodiment, the presence or lack thereof regarding such a flag would be detectable via automated means such as ECC parametric characterization.

In these and other embodiments, the flag under consideration could be placed into what can be called the data area of the media, or to other areas such as the burst cutting area (BCA) as found on many optical discs. As an example, we can consider the use of data and or error correcting codes (ECC) which can be typically found in the BCA region of a replicated DVD disc. To further illustrate this example, the DVD BCA system as specified in ECMA-267 provides for up to 188 bytes of payload data and up to 16 bytes of ECC using 4-way interleave. This example non-limiting embodiment alters data and/or ECC codes in the BCA region as an example of media flagging. In this example, the BCA would be altered in such a manner that the ECC readback characteristics are uniquely identifiable, signaling the flag of interest. Such signals would allow the flag characteristics to be separated from noise phenomenon characteristics such as manufacturing defects, normal use scratches, or other marks.

In yet another non-limiting embodiment, we can consider writing new information into the BCA region of an optical disc such as DVD or Blu-ray. An example of this embodiment would be the creation of a BCA data structure where none previously existed. This embodiment offers a method to write new BCA data, including sync codes and ECC codes, into the BCA region using an appropriate high power laser.

BRIEF DESCRIPTION OF THE DRAWINGS

These and other features and advantages will be better and more completely understood by referring to the following detailed description of exemplary non-limiting illustrative embodiments in conjunction with the drawings of which:

FIG. 5 shows an example non-limiting optical disc signal processing data path.

FIG. 6 shows an example non-limiting 37,856 byte physical ECC data block for DVD (32KiB user data).

FIG. 7 shows example row-wise PI error correcting.

FIG. 8 shows example column-wise PO error correcting.

FIG. 9 shows an example non-limiting ECC sensor and PI/PO correction counts.

FIG. 10 shows an example non-limiting DVD Physical and Logical layout (from ECMA-267).

FIG. 11 shows an example non-limiting DVD Physical Zone Geometry (from ECMA-267).

FIG. 12 shows an example non-limiting PI/PO sensor data via diagnostic port (flagged DVD).

FIG. 13 shows an example non-limiting PI/PO sensor data (non-flagged DVD).

FIG. 14 shows an example non-limiting DVD Numerical Aperture Lens.

FIG. 15 shows an example non-limiting rewritable disc laser power.

FIG. 16 shows an example non-limiting writing of a Flag on read-only media.

FIG. 17 shows an example non-limiting flag shape and location example #1

FIG. 18 shows an example non-limiting flag shape and location example #2.

FIG. 19 shows an example non-limiting flag shape and location example #3.

FIG. 20 shows an example non-limiting process for capturing serial number data (e.g. BD media)

DETAILED DESCRIPTION

Figure 1:
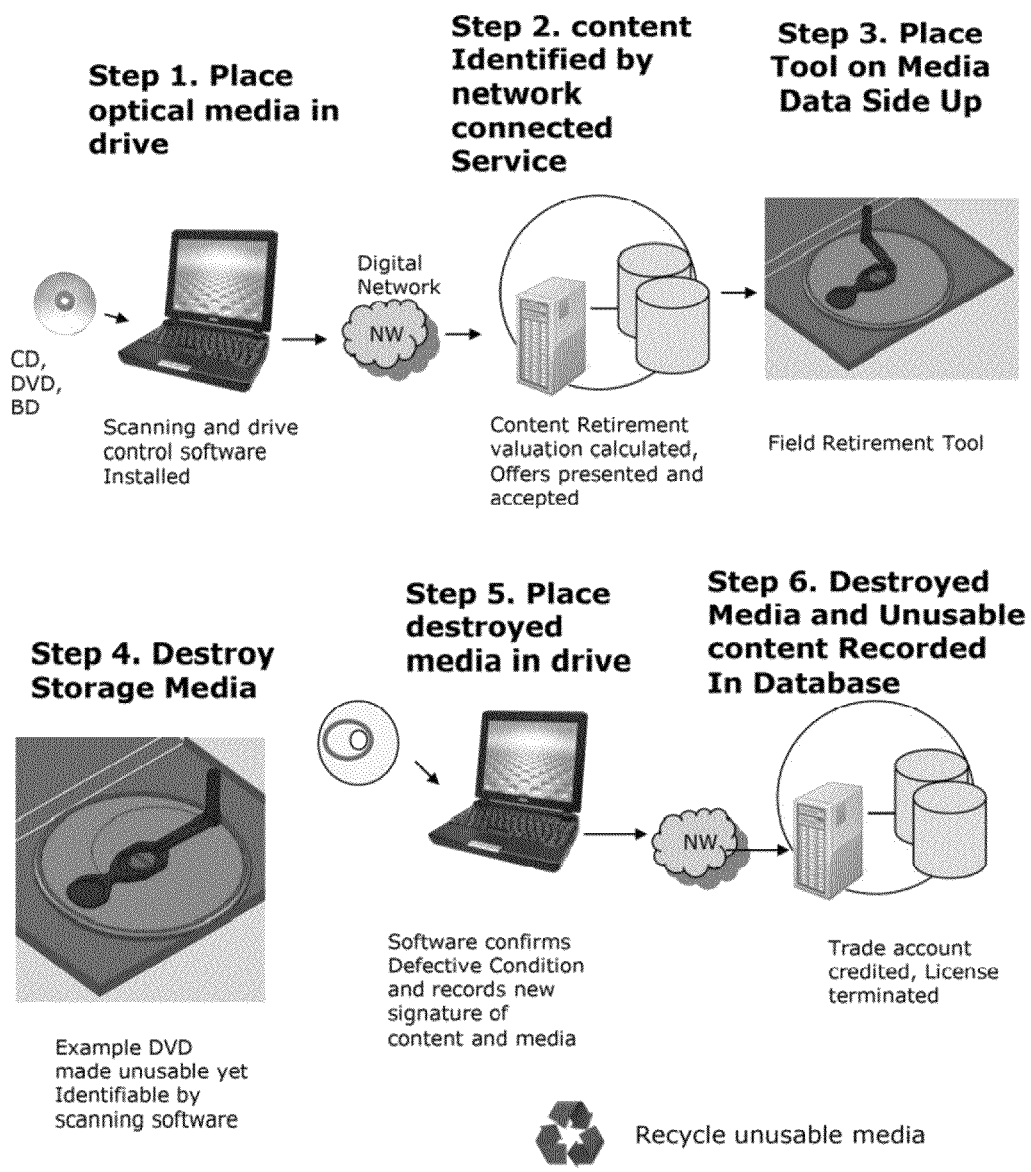
FIG. 1 is a diagram of an example non-limiting electronic system for the field identification, destruction, retirement, and accounting of licensed content stored on optical media.

FIG. 1: is a diagram of an example non-limiting electronic system for the field identification, destruction, retirement, and accounting of licensed content stored on optical media. Process steps described in FIG. 1 are numbered in accordance with an exemplary non-limiting sequence. In Step 1, the process is initiated by placing licensed content stored on read only optical media in the form of a Compact Disc (CD), Digital Versatile Disc (DVD) or Blu-ray disc (BD) into the optical drive of a network connected digital client device operated by the consumer. The client system is connected using a digital network to an application server operated by the content owner or authorized intermediary. Step 2: Software, either residing on the client device, the application server, or both, identify the content by scanning data stored on the optical disc, its data structure, watermarks, metadata, and properties that comprise a unique signature of the disc. Once the content has been identified, a retirement valuation is calculated and an offer to retire the content is presented for acceptance by the consumer. Steps 3 and 4: The consumer uses a tool to sufficiently destroy the content stored on the disc to a level where it becomes valueless; however sufficient information is retained that is used to identify the content and validate its destruction. Step 5: A second scan of the destroyed disc captures a unique signature of its post destruct properties and data that can be used to identify the destroyed disc if needed. This post destruct signature is retained by the network host system in a data base for audit and validation purposes. Step 6: Following an update of licensing records, the consumer's trade account is credited for the retirement value of the content which may then be used to purchase new content, purchase new usage rights, exchange usage rights with a third party, obtain the same content stored to alternative media, or obtain enhanced versions of the same content.

Figure 1A:
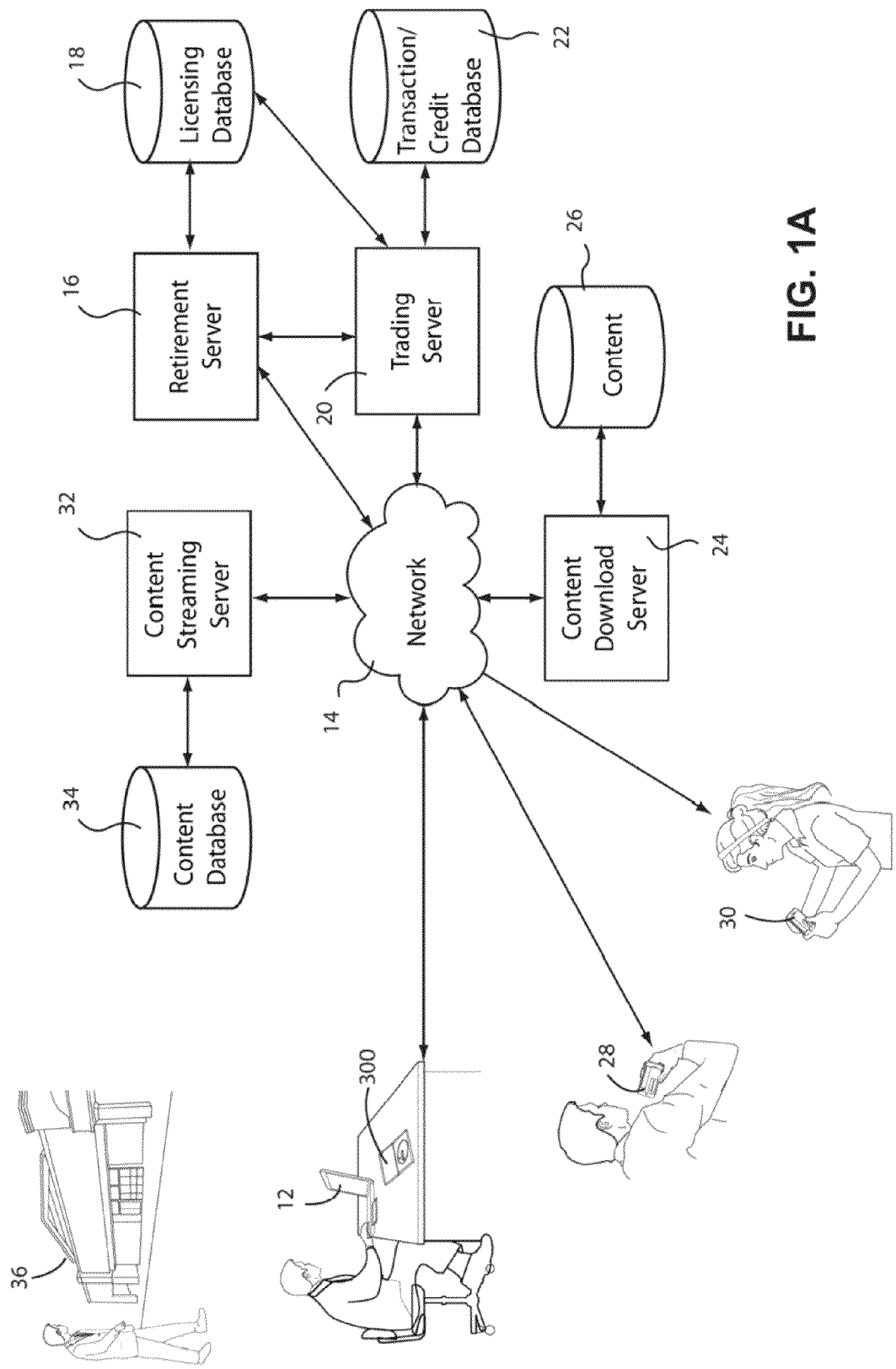
FIG. 1A is a schematic diagram of a non-limiting network-based system architecture.

FIG. 1A: shows an example non-limiting system architecture. In the example shown, a user who wishes to retire a storage medium uses a retirement tool 300 and additional electronic equipment (e.g., a conventional network-connected personal computer or the like including a storage medium reader) to retire a storage medium and report the retirement over a network 14 to a retirement server 16 in a verifiable manner. The retirement server 16 updates a licensing database 18 based on the retirement, and can share that verified retirement with a trading server 20 either directly or over network 14. Trading server 20 may take various actions such as issuing the user a credit via a bank or other financial institution, issuing a store credit for a brick-and-mortar retailer 36, providing an authorization for a content streaming server 32 to stream content from a content database 34, authorizing a content download server 24 to download content 26, sending a replacement physical storage device, etc. The trading server 20 can issue authorize delivery of the same or further content over network 14 to the same user but to a different device (e.g., a smart phone 28, tablet computer, or any other appliance), or it may authorize delivery to a different user or group of users 30.

Figure 2:
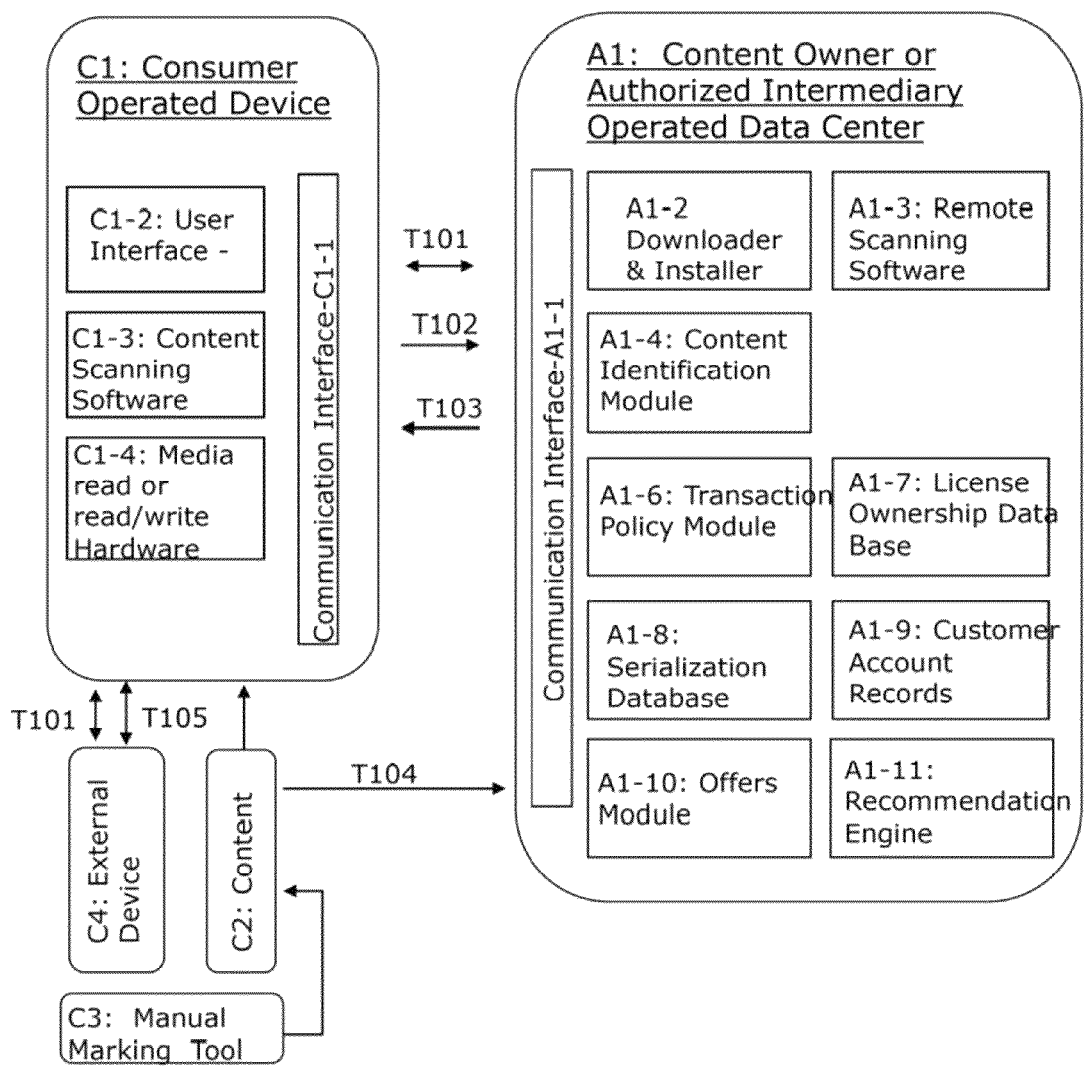
FIG. 2 shows example non-limiting system components.
Figure 3A:
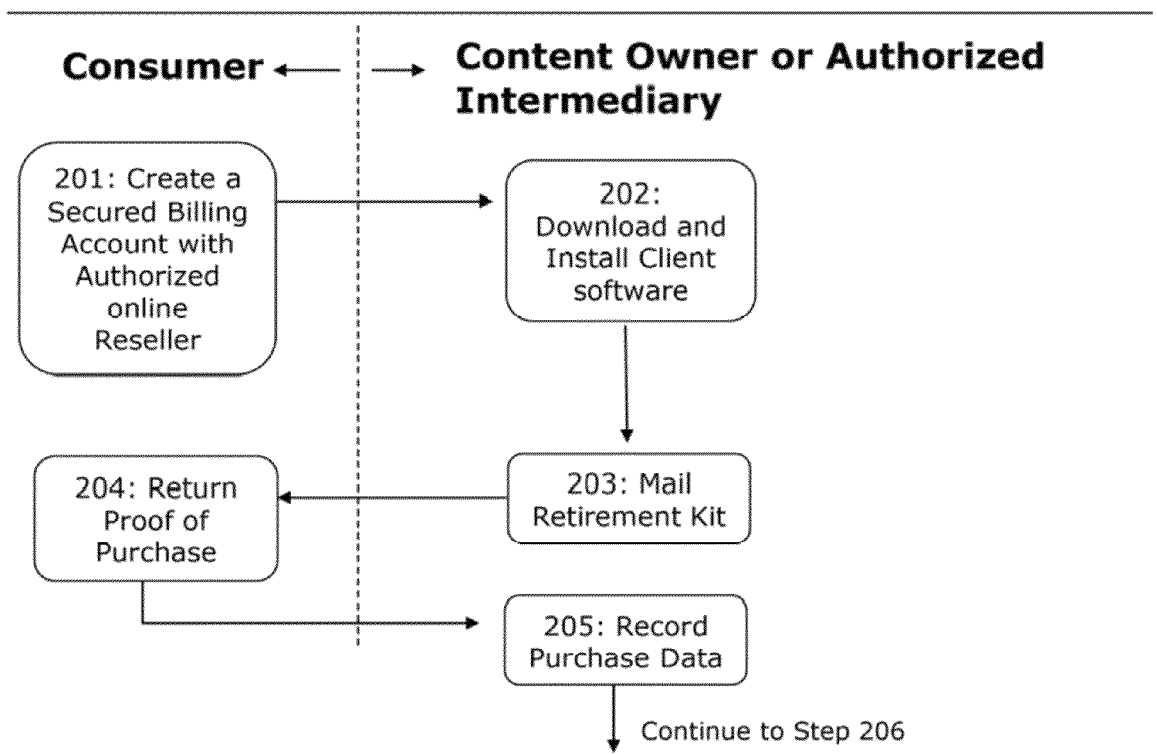
FIGS. 3A-3E show an example non-limiting process by which media content stored on read only optical media is identified, valued, destroyed, and verified in the field to support an electronic commerce transaction.
Figure 3B:
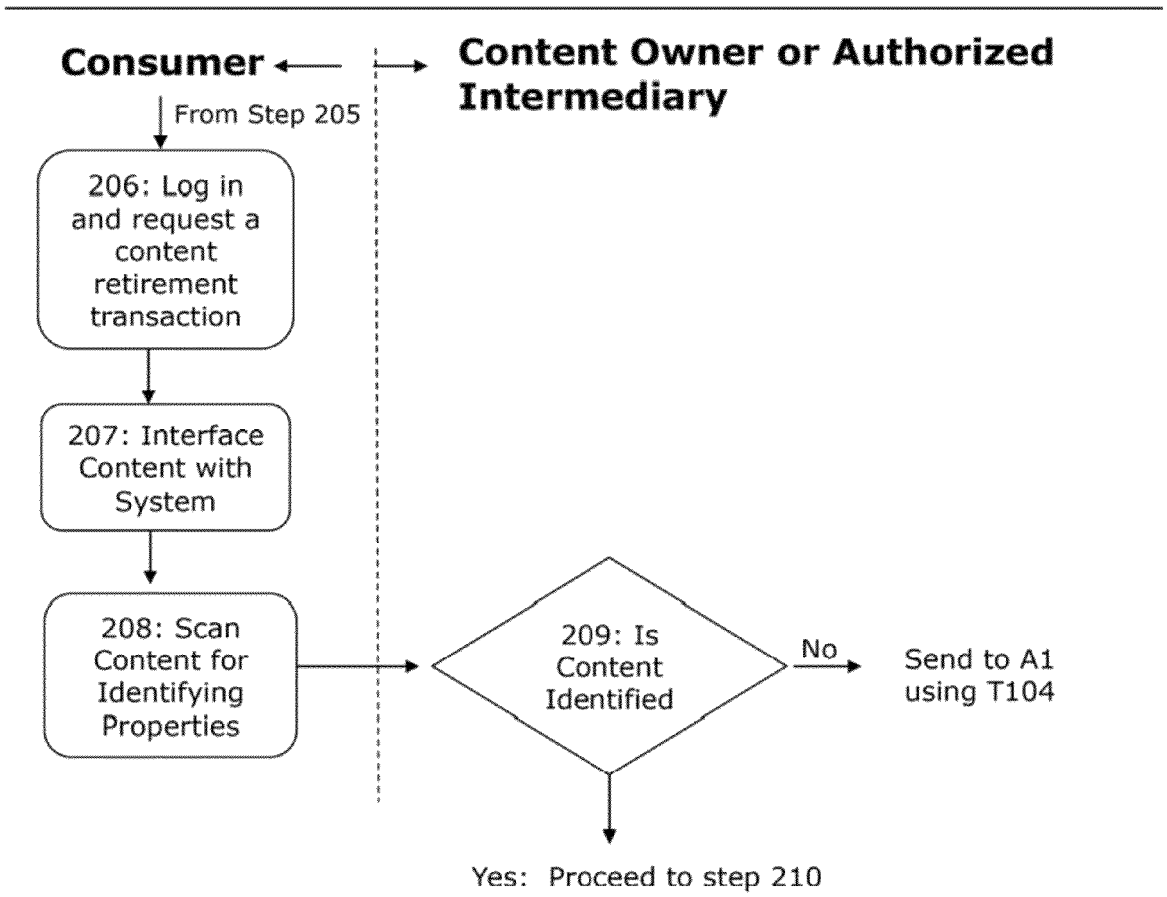
Figure 3E:
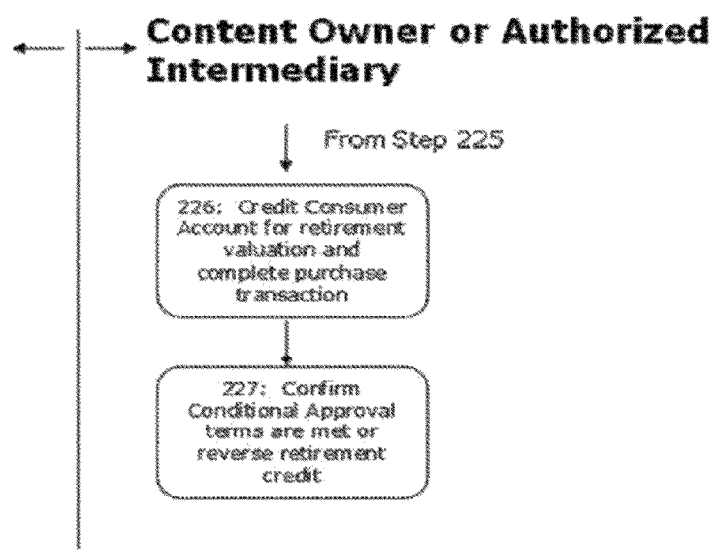

FIG. 2: is a description of example non-limiting system components. The illustration describes a networked computing structure where a Consumer Operated Device (C1), communicates with a Data Center operated by the content owner or authorized intermediary (A1), over a digital network (T101). In one non-limiting illustrative example, Consumer Operated Device (C1) could for example comprise personal computer 12, smart phone 28, or other user device shown in FIG. 1A, and Content Data Center (A1) could comprise, include or consist of Retirement Server 16 with or without other components such as Trading Server 20, Content Download Server 24, Content Streaming Server 32, etc.

The Consumer Operated Device (C1) automates processes in support of content identification, retirement, valuation, and accounting, under the control and record keeping of the Content Data Center (A1). The digital network (T101) may be implemented as a Wide Area Network (WAN), Internet, Local Area Network (LAN), Personal Area Network (PAN), or any other digital network that creates a bi-directional digital communication link. The Consumer Operated Device (C1) may be located anywhere; however it would typically be located in the field or at a location geographically separated from the Content Data Center (A1). Typically multiple Consumer Operated Devices (C1) would interface with the Content Data Center (A1). The Consumer Operated Device (C1) may be produced as a variety of products including but not limited to a personal computer, a laptop computer, a DVD or Blu-ray media player, a portable media player, a web tablet, a television a set top box, a digital video recorder, or personal media server. While the Consumer Operated Device (C1) would typically be in the possession of the consumer, it may also be in the possession of a content owner or authorized intermediary as in the case of a media kiosk, library or point of sale terminal in commercial space with public access.

Information and/or content would normally transfer between the Consumer Operated Device (C1) and the Content Data Center (A1) over the digital network (T101), however; in certain cases, it may also be physically delivered between the Consumer Operated Device (C1) and Content Data Center (A1) by mail or other terrestrial methods of delivery as indicated by T102, T103, and T104.

Other components illustrated in FIG. 2 of the system are described as follows:

Content, stored on read only storage media, including but not limited to DVD disc, Blu-ray disc (BD), Compact Disc (CD), recordings on vinyl (Records) are depicted by C2. Content (C2) physically interfaces with the Consumer Operated Device (C1) where it is read.

External Devices (C4) may be connected to the Consumer Operated Device (C1) for audio/video output, input, and/or control of the system. External Devices (C4) are connected with to the Consumer Operated Device (C1) by a Digital Network (T101) or by a data buss, or cable interconnect (T105), non-limiting examples of which may include HDMI, Component Video, Universal Serial Bus (USB), DVI, VGA, ESATA, and Composite video cables among others.

The Field Retirement Tool (C3) is a tool used to sufficiently destroy content files stored on read only media (C2) to render the content stored therein valueless, while retaining sufficient properties for the Consumer Operated Device (C1) to identify the content following its destruction. The Field Retirement Tool may take a variety of forms depending on the storage media used and recording methods. C3 may be a manual tool used by the consumer or integrated as a component in the Consumer Operated Device (C1), or as a component integrated with an External Device C4 that is connected to C1.

The components of an example non-limiting Consumer Operated Device (C1) include the following:

A Communications Interface (C1-1) to manage digital communications between networked or interconnected devices.

User Interface (C1-2), is software for the control and operation of the Consumer Operated Device. The Consumer Operated Device may include a monitor or screen to output the user interface, or the interface may be output on an external device (C4).

Content Scanning Software (C1-3) controls the operation of the Media Read or Read/Write Hardware (C1-4), executes content scanning protocols, and reduces information captured from the scanning of data and/or storage media into a digital file that is used by the Content Data Center (A1) to identify the content and Stock Keeping Unit of the media and content.

Following the destruction of the content, the Content Scanning Software (C1-3) creates a file of the unique properties or signature of the post destruct content and media for audit purposes. Pre and Post destruction properties of the content and media may include data from a wide range of sources including data files, metadata, file structure, extrapolated data from destroyed regions, embedded watermarks, serial numbers, tags, keys, tables, track lengths and other unique properties of the content, media and organization of the media.

Media Read or Read/Write Hardware (C1-4) is hardware that interfaces with storage media to read data or recordings of content that are stored on the media. The Media Read or Read Write Hardware may integrate technologies that destroy content stored on media. Content stored on storage media may include digital files or analog recordings. Examples of C1-4 include DVD or BD Read Only, or Read/Write Drives, CD Read or Read/Write Drives, Charge Coupled Devices or CCD's capable of optical scanning of physical media.

The Components of the Content Owner or Authorized Intermediary Data Center are described as follows:

Note, for simplicity the components or A1 are depicted as collocated however they may also be distributed and connected with a data bus or digital network.

A Communications Interface (A1-1) to manage digital communications between networked or interconnected devices.

Downloader and Installer (A1-2) is software that manages the downloading and installation of software transferred between the host data center (A1) and the Consumer Operated Device (C1) Downloaded software may include any software or firmware that is required by C1 to perform its function.

Remote Scanning Software (A1-3) is software similar in function to C1-2 that operates on the Consumer Operated Device; however, (A1-3) implements the content scanning function remotely from the Data Center Host (A1) using the Digital Network (T-101).

Content Identification Module (A1-4) is software and an automated database of properties assigned to each merchandisable unit of content and media offered by content owners in commerce that uniquely identifies the content when scanned. Identifying properties and other records are associated in the database to create a rich profile on each merchandisable unit of content. Other information associated with content may include release date, stock keeping unit, bar codes, region codes, release version, aspect ratios, formatting, resolution, languages, trailers included, audio tracks, and other information useful in merchandising content.

The Content Identification Module (A1-4) receives identifying information of Content C2 from the Content Scanning Software (C1-2 or A1-3), compares this information against its comprehensive database of identifying data and properties from each merchandisable unit of content in the industry, identifies a set of matching records associated with a content title, label or tag to identify Content C2.

The Content Identification Module (A1-4) may also receive information from the scanning of destroyed content and compare this information against its records to identify retired content after it has been destroyed.

Content Valuation Module (A1-5) is software that automates the process of valuing content, or licenses to content, that is offered for sale or exchange by the licensee. Valuation information may be sourced from content owners or other third parties who are interested in acquiring the right to use or merchandise the content. The content valuation module may accept bids for the purchase of a merchandisable unit of content or license from prospective buyers. The Content Valuation Module includes the capability to alter valuation based on time from a previous valuation or time from commercial release date of the content offered for exchange or sale by the licensee.

Offers Module (A1-10) is software that prepares and presents offers in support of transactions for the sale, exchange, trade-in, or outright purchase of a merchandisable unit of content or licensed rights. In the case of an outright purchase of content or a license, the offers module prepares pricing for purchase transactions for content or licenses where no content or license is offered in trade for the purchase of new content or licenses.

The Offers Module is a merchandising platform of software that automates the process of pricing rights transactions or licenses in accordance with business criteria and market valuations. Market valuations are obtained from the Content Valuation Module (A1-5), business criteria may be sourced from content owners, authorized intermediaries, or consumers who have an account relationship. Business criteria may include among others, the nature of the transaction in the form of a trade-in or outright purchase, the time from commercial release date of any content or license to be purchased, policies for the use of any content or license to use content purchased which may include such policies as allowable number or copies that may be created from the content, and rights to exchange or transfer the content or license among others, format or the content or license to be purchased which may include criteria for resolution, quality, aspect ratio, and required content protection technologies among others, geographic region for the sale and use of the content, trading costs and reseller margins, promotional pricing information from the content owners, trading relationship (Commercial or retail account), volume of trading activity, and status of participants in the transaction with respect to membership in a sharing community, network, or subscription service. In addition to accessing valuation records in (A1-5) the Offers Module accesses information from the License Policy Module (A1-6), Customer Account Records (A1-9), and the License Ownership Data Base (A1-7), and the Recommendation Engine (A1-11) in support of preparing offers.

The Offers Module prepares and sends offers data over T101 to C1 for where they are prepared for display by the User Interface C1-2, and then displayed on C1, or attached output devices C4.

Customer Account Records (A1-9) is an automated database that contains customer information used to identify and authenticate customers and complete transactions. Customer Account Records includes billing records, payments, credit card information, credit balances from the retirement of content or licenses, account preferences for communications and marketing, content ownership records, customer memberships in trading communities and/or social networks, and records on interests, demographics, and other attributes useful for the merchandising of content or licenses.

To facilitate the secondary market for the sale and exchange of content or licenses, Customer Account Records includes records on content or licenses owned by the customer that are offered for sale or exchange as well as records on content wanted for purchase or trading. The Offers Module (A1-10) accesses Customer Account Records for content or licenses that are offered for sale or trade by a customer, matches these records with other account records from customer's who seek to obtain the same content and prepares offers for the sale and purchase of the content or licensed rights.

License Ownership Data Base (A1-7) records and maintains the status of any purchased license owned by the customer. The License Ownership Database (A1-7) records current status and history of any transaction made by the consumer for any license to a merchandisable unit of content. The License Ownership Database receives transaction information from Customer Account Records (A1-9), following satisfactory completion of a transaction. The License Ownership Database may grant conditional or time limited licenses pending the satisfactory completion of a required action by the licensee or a recipient. An example of the granting of a conditional license may result from the consumer providing inadequate proof of ownership for retired or exchanged content, whereby a license is conditionally granted pending satisfactory completion of a proof of ownership process.

License Policy Module (A1-6) is software and an automated database that receives information from content owners on the approved terms and conditions for the use, format, protection, and exchange of content or rights they offer for sale. The License Policy Module (A1-6) supplies these terms and conditions to the Offers Module (A1-10) that uses the information to create offers.

In addition The License Policy Module A1-6 includes policies that govern the approval of content or license transactions depending on the type of information provided by the consumer to verify their ownership of the content or license.

Destroyed Signature Database (A1-8) is an automated database that records the identifying properties or signature of content and its storage media that has completed the destruction process. The Destroyed Signature Database A1-8 receives data from the Content Scanning Software (C1-3) residing on the Consumer Operated Device (C1) or the Remote Scanning Software (A1-3) residing on the Content Owner or Authorized Intermediary Data Center (A1). The data recorded in A1-8 is used to provide a record that can used to support auditing of destroyed content to reduce and reduce risk of fraud. Among other uses, data from the Destroyed Signature Database A1-8 may be used to provide reasonable assurance that one piece of destroyed content is not used to support multiple trade-in or sale transactions, and that destroyed content remains in the possession of a licensee who offered it in exchange for compensation or trade.

Recommendation Engine (A1-11) is software and an automated cross marketing database that includes records that classify content by distinguishing attributes that are useful in relating one piece of content to another piece or group of content. Examples of attributes that may be assigned to a piece of content may include genre of the content, cast members, actors, musicians, artists, year of production, similarity of plot, story, outcomes, situations, emotional response among others. Content records classified by attributes is matched with customer interest and purchase data stored in the Customer Account Records A1-9 to develop personalized recommendations that match content with customers interests to facilitate the merchandising of content. Content recommendation information is used by the Offers Module A1-10 to create personalized offers for the sale of trading of content. The Recommendation Engine captures information from browsing history in the User Interface C1-2, content ownership records from the Customer Account Records A1-9, and content titles identified from scanning records in the Content Identification Module A1-4.

FIGS. 3A-3E show an example non-limiting process by which media content stored on read only optical media is identified, valued, destroyed, and verified in the field to support an electronic commerce transaction.

The process identifies the party responsible for each step in the process. Consumer executed processes are identified as process steps that fall to the left of the dashed line, while Content Owner or Authorized Intermediary process steps fall the right of the dashed line.

The process is described as follows:

Step 201: Using their Consumer Operated Device C1, its user interface C1-2, and the Digital Network T101, the consumer creates a secured billing account with the Content Owner or Authorized intermediary A1. The consumer provides information to identify and authenticate sessions in the form or a unique log in and password. The customer provides payment information in the form of credit card numbers to facilitate future payments for content or license transactions. The consumer provides further account information as needed to facilitate content or license transactions including but not limited to address, contact preferences, names of immediate family members and their ages, marketing preferences, telephone number, social networks, and interests. The customer then accepts a download and installation of software needed to facilitate transactions on A1 and C1.

Step 202: Content Owner or Authorized Intermediary Data Center (A1) downloads and installs Content Scanning Software (C1-3) onto C1 using T101.

Step 203: Content Owner sends a Content Retirement kit to the Consumer using T102. The Retirement Kit includes the Field Retirement Tool (C3) self addressed mailing labels, and shipping envelopes for content.

Step 204: At the discretion of the consumer, they may elect to send content (C2) they offer for retirement to the content owner or authorized intermediary for credit, or they may send in proof of purchase of their content in the form of proof of purchase labels that were attached to content packaging, scans of the packaging, receipts, or other forms of proof. The consumer uses the self addressed mailers provided in Step 203 and terrestrial shipping (T104) to send content C2 or proof of purchase information to the content owner or authorized intermediaries for processing. C1 may prepare scanning records or other data files that are stored on media and sent to the content owner or authorized intermediary using terrestrial shipping methods as indicated with T102. The content owner may also send data files or content stored on media to the consumer for use by C1 using terrestrial shipping methods as indicated by T103.

Step 205: Once C2 and/or proof of purchase information is received and accepted by the content owner or authorized intermediary, records are created in the Customer's Account Records database in A1-9 recording the receipt of content and/or proof of purchase information.

Step 206: Consumer's may elect to not return content (C2) they wish to retire for processing and/or may not return proof of purchase information, instead they may choose to use the field retirement process by logging into their account using C1, and connecting directly to A1 using the digital network T101. Using the User Interface C1-2, the consumer requests a content retirement transaction from the online system.

Step 207: The content owner data center A1, and the user interface C1-2, instructs the consumer to interface their content (C2) with the Media Read and/or Read Write Hardware C1-4. Interface of C2 with C1-4 may be performed by placing an optical disc into the Compact Disc (CD) and/or combination CD and DVD and/or BD disc drive of C1, connecting content directly to a data bus T105 as with USB, Serial ATA Connection or other data bus interface, or by using an External Device (C4) to read and/or inspect content C2. Among others, External Devices may use optical scanners or charge coupled devices (CCD's) to optically inspect recording tracks of Records.

Step 208: C1 uses the Media Read and or Read/Write Hardware C1-4, and Content Scanning Software C1-3 to scan content C2 for identifying data and properties of its storage. Data may be extracted from files residing on the disc, metadata stored on the disc, keys, watermarks and other data. Properties may include such items as track locations, track lengths, data structure, file formats, tables, press marks, and manufacturing artifacts. Analog recordings may be input and digitized to create a record that uniquely identifies the content. Content Scanning Software C1-3 or A1-3 receives information from C1-4 or C4 and creates a scanning record that identifies properties content C2, this information is analyzed for matching records by the Content Identification Module A1-4 on A1 to identify the content C2.

Step 209: Scanning is conducted until either Content is successfully identified, or not within a predetermined time limit. If C2 is identified a record of the identifying data of C2 is stored by the Content Scanning Software C1-3 in the Customer Account Records A1-9 and the process continues to step 210. If the content can not be identified by the system, the user interface C1-2, instructs the consumer to send C2 to A1 for processing using T104.

Step 210: Once C2 has been identified, A1 queries License and Ownership records of the License Ownership database (A1-7) and Customer Account Records (A1-9) to determine if an ownership record for content C2 has been recorded and associated with the consumer or immediate family members of record in A1-9.

Step 211: If ownership records associated with the consumer or their immediate family are found in the License Ownership database A1-7 or Customer Account Records A1-9, for content C2, and there has been no previous retirement transaction recorded for C2 associated with the consumer or their immediate family members, then the process continues to step 216; otherwise it proceeds to step 212.

Step 212: Starts by querying retirement transaction policy records of the License Policy Module database of A1-6. A1-6 specifies whether further proof of ownership is required by the content owner on that particular date and time. Content Owners may instruct A1-6 to change Proof of ownership criteria depending on the time that has elapsed from the market introduction or release date of C2 in any form including the first public exhibition date of the content, the first release date on packaged media, or other date they choose. If no proof of ownership requirements are required to complete a content retirement transaction, A1-6 allows the process to proceed to step 216, otherwise it continues to step 213.

Step 213: Policies set within the License Policy Module A1-6, may require proof of ownership processes to be completed before allowing the system to proceed to step 216, or policies may be set to conditionally allow the retirement transaction to proceed pending an agreement by the consumer to satisfy proof of ownership requirements by a future date and time. The method by which proof of ownership requirements may be completed at a future date or time is called Conditional Approval. The License Policy Module A1-6, queries license policy records to determine if Conditional Approval is allowed or not for content C2, and if it is allowed, the process continues to step 214. If Conditional Approval is not allowed, the process does not continue to step 216 until proof of ownership requirements are met by the consumer in Step 215.

Step 214: In the case where Conditional Approval is allowed by the content owner, the user interface C1-2, informs the consumer on the terms of Conditional Approval. If the consumer accepts the terms of Conditional Approval the process continues to Step 216. If the consumer declines to accept the terms of Conditional Approval, the process for retiring and valuing content C2 is aborted, however A1 may prepare and present offers in the user interface C1-2, for content or rights offerings that do not include the retirement of C2 in Step 217.

Step 215: Proof of ownership requirements are determined by the content owner, however; as a means to expedite the process or completing a content retirement transaction that requires proof of ownership, Step 215 supports automated processes that are executable in the field that lower the risk of fraud. Any combination of the following may be used in step 213 to satisfy content proof of ownership requirements from the field location:

The consumer may be required to select a button in the user interface C1-2 that attests to their ownership of the content.

The user interface C1-2 may inform the consumer that an auditable record of the destroyed content will be created and retained by the system.

Using the Consumer Operated Device C1, the user interface C1-2, and in some cases an External Device connected to C1 through T101 or T105, the consumer may be required to input identifying information of C2 using a keypad, optical scanner, or other device that would indicate the consumer has possession of C2 and its retail packaging.

The consumer may be required to retain and rescan the destroyed content at a future date. Information collected by C1-3 from the rescanning of the destroyed content C2 is compared with the destroyed content signature data residing in A1-8 to confirm the consumer has retained possession of the destroyed content C2.

The License Policy Module A1-6 software executes any automated proof of ownership processes and records their completion in the Customer Account Records database A1-9, and License Ownership Records A1-7.

Step 216: Now with the content identified, and proof of ownership requirements satisfied, the Content Valuation Module A1-5 proceeds to value content C2 or licenses for its residual value at that moment in time. The Content Valuation Module A1-5 collects and records retirement valuation information from content owners and records this information into a valuation database. Content owners may change valuations at any time in accordance with market conditions or specify a valuation formula that calculates the valuation based on market criteria and/or time from content C2 release date. In addition to valuations assigned by content owners, A1-5 collects and maintains separate records of bids offered for the purchase of content C2 from third parties or individuals. The Content Valuation Module A1-5 retrieves both content owner and secondary market valuations for content C2 and passes this information to the Offers Module A1-10.

Step 217: The Offers Module A1-10 may increase or reduce the retirement value provided by the Content Valuation Module A1-5 for Content C2 for a variety of reasons. The Offers Module A1-10 is capable of receiving and integrating promotional pricing instructions from content owners that may increase C2 valuation. The Offers Module A1-10 may reduce retirement value to cover trading costs or commissions. The Offers Module A1-10 may add exchange license fees for content transactions between individuals in the secondary market for the content or rights. The Offers Module A1-10 may change retirement valuation of C2 depending on the how the residual valuation of C2 is to be used. For example, if C2 is to be used in trade in for new release content it may command a different trade in valuation than when applied to library content or general account credit. When preparing offers, the Offers Module uses content recommendations provided by the Recommendation Engine A1-11 to create offers that are tailored for the consumer's interests.

Step 218: The Offers Module A1-10 prices offers for a variety of content or license transaction scenarios, transfers the offers to C1 using T101, and presents these offers in the user interface C1-2. C1-2 may be displayed on an External Device C4 or displayed by C1.

Step 219: The consumer reviews the offers and either accepts or rejects an offer. If the consumer rejects the offers, the process ends and the consumer does not retire Content C2, if the consumer accepts an offer, the accepted offer is recorded in A1-9 and the process continues to step 220.

Step 220: In this step the content C2 is destroyed to a level to render it valueless. If the destroy tool is integrated within the Media Read or Read/Write Hardware C1-4, the consumer interfaces Content C2 with the Media Read or Read/Write Hardware C1-4, and the Media Read or Read/Write Hardware implements the destruction of C2 content, if a Manual Field Retirement Tool C3 is used, the user interface C1-2, instructs the consumer on how to destroy content C2 by using C3.

Step 221: Once the content destruction process is finished, the content C2 is rescanned to confirm it has been adequately destroyed. If the Manual Field Retirement Tool C3 was used, the consumer interfaces Content C2 with the Media Read or Read/Write Hardware C1-4 to conduct the scanning of C2. If the destruction process was done by C1-4, C1-4 automatically starts the rescanning process once content destruction is finished.

Step 222: The Media Read or Read/Write Hardware C1-4 reads data and properties of the post destruct content and media C2 and passes this information to the Content Scanning Software C1-3. The Content Scanning Software C1-3 uses software to control the Media Read or Read/Write Hardware C1-4 to ensure the Media Read or Read/Write Hardware adequately scans the media regardless of the destroyed regions on the C2 storage media. The Content Scanning Software C1-3 reduces scanning information to a post destruct signature file that uniquely identifies the post destruct properties of the destroyed content and media C2. This signature data is compared to the pre-destruct data and signature of C2 on file in the Customer Account records A1-9, to determine if sufficient content has been destroyed to make C2 unusable. The Content Scanning Software C1-3 fetches policy records in the License Policy Module A1-6 for content destruction acceptance criteria in assessing the degree by which content must be destroyed. The Content Scanning Software C1-3 also confirms the post destruct content signature of C2 sufficiently matches the pre-destruct signature fetched from the Customer Account records A1-9 of the content and media of C2, to conclude with high certainty that the two signatures originated from the same source. If the Content Scanning Software determines the content has been sufficiently destroyed the process continues to step 223, otherwise the consumer is instructed to perform additional destruction and the process returns to step 220.

Step 223: Once the Content Scanning Software C1-3 determines Content C2 has been adequately destroyed, the post destruct signature of C2 is stored in the Destroyed Signature Database A1-8 on A1 for future reference and auditing purposes. The process continues to Step 224.

Step 224: The Content Scanning Software C1-3 sends a record certifying the successful destruction of C2 to A1 using T101. The record is stored in the Customer Account Records database A1-9. The process then continues to Step 225.

Step 225: Customer Account Records A1-9 updates the License Ownership Database A1-7 to terminate any license to use C2 associated with the consumer or their immediate family members. A record is retained in the License Ownership Database A1-7 of the retirement of C2 by the consumer. The process then continues to step 226.

Step 226: The retirement value of C2 that the consumer approved in Step 219 is fetched from the pending transaction record stored in the Customer Account Records database A1-9, and that amount is added to the customer trading account that is stored in the Customer Account Records A1-9. If the offer approved in step 219 is a trade-in of content C2 for new content or rights, A1 completes the transaction and applies trading credit to offset the purchase price of the new content.

Step 227: The License Module A1-6 confirms if proof of ownership requirements have been satisfied within the grace period. If the consumer fails to meet proof of ownership requirements within the grace period accepted in step 214, the system reverses any payment or compensation made for the residual value of the retired content in Customer Account Records A1-9 and notification of the transaction is sent to the consumer.

Figure 4A:
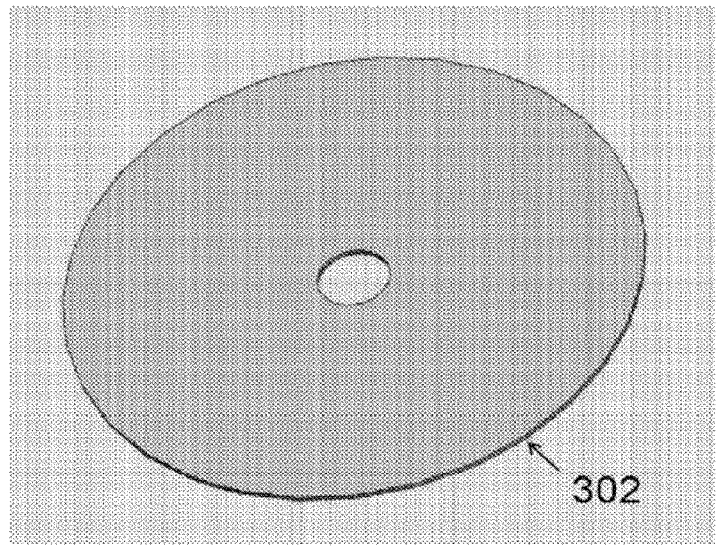
FIGS. 4A-4P describe an example non-limiting Manual Field Retirement Tool for content stored on Read Only Optical Media.
Figure 4A:
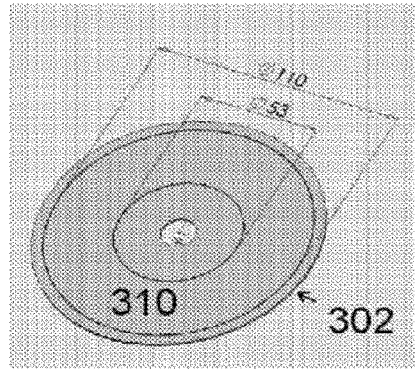
Figure 4A:
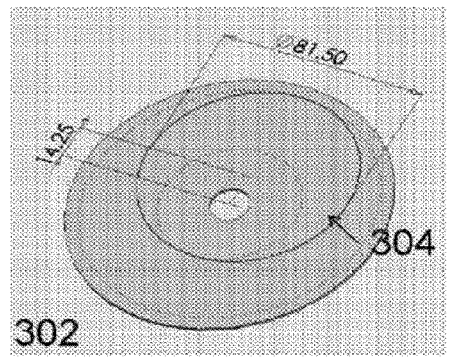
Figure 4I:
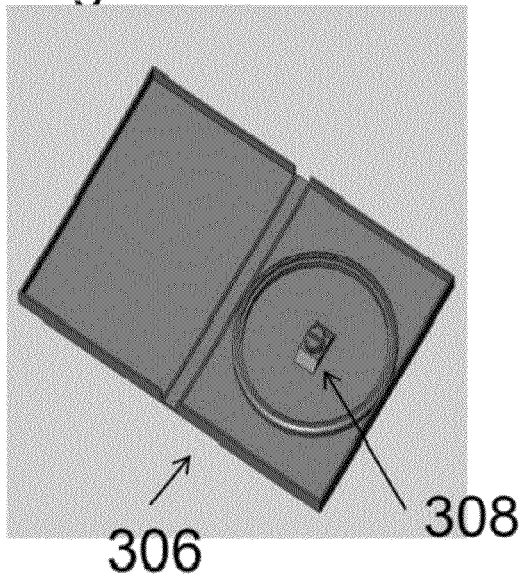
Figures 1, 4I:
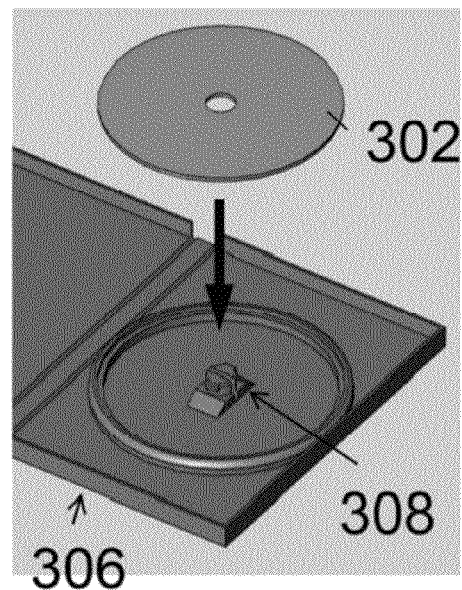
Figures 2, 4I:
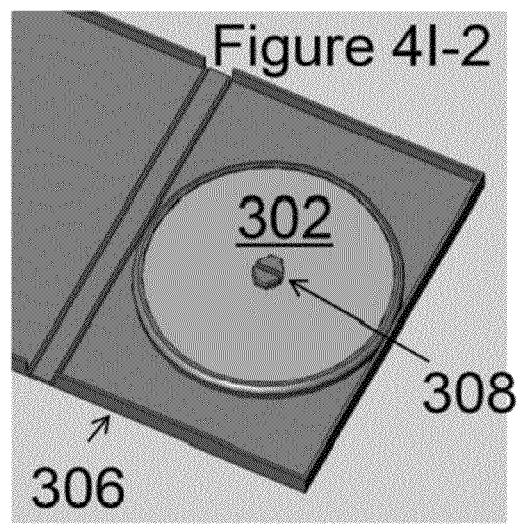
Figures 1, 4J:
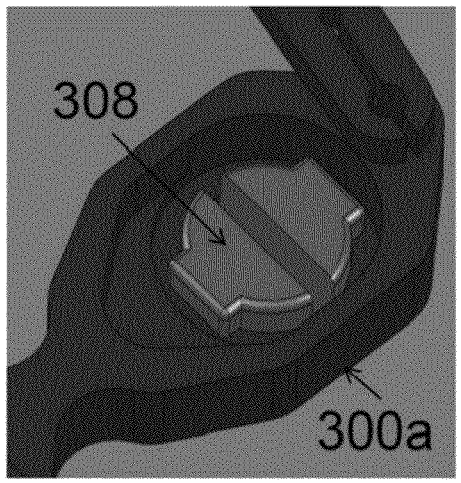
Figures 2, 4J:
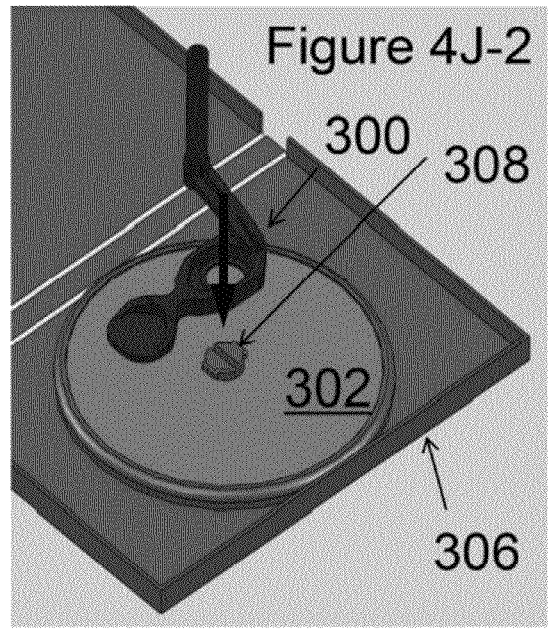
Figures 3, 4J:
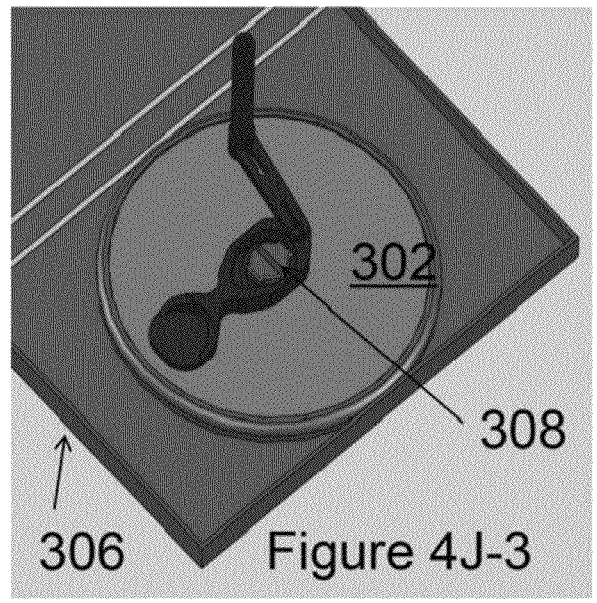
Figure 4K:
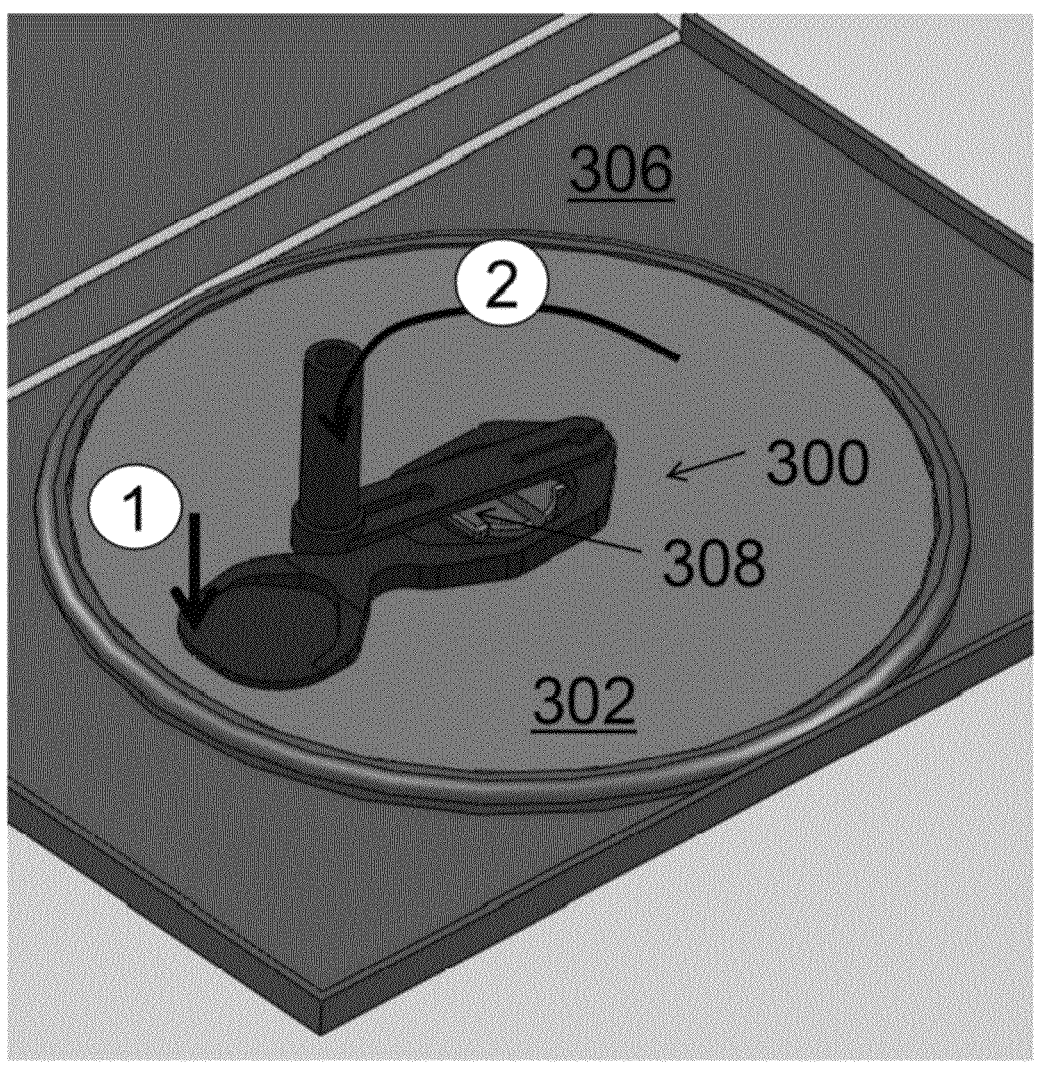
Figure 4L:
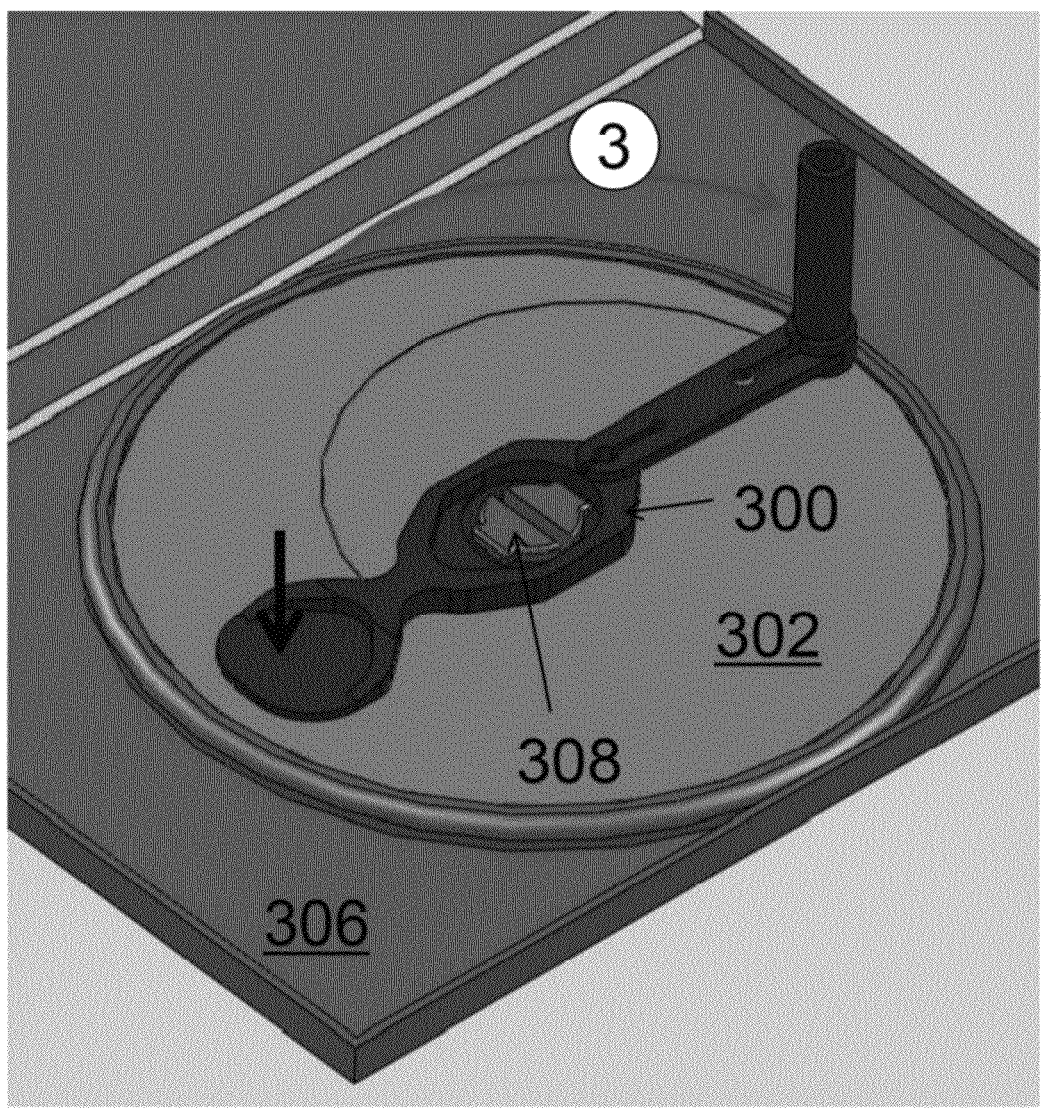
Figure 4M:
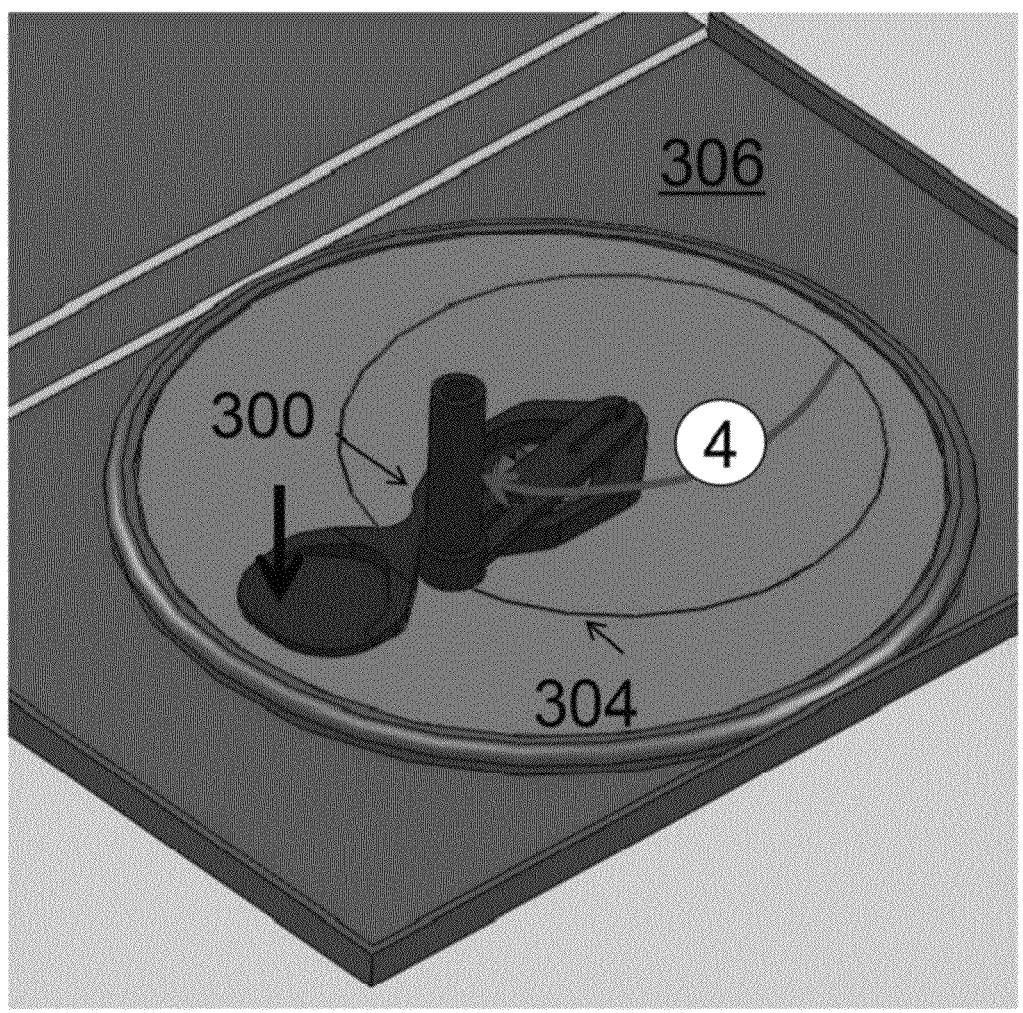
Figure 4N:
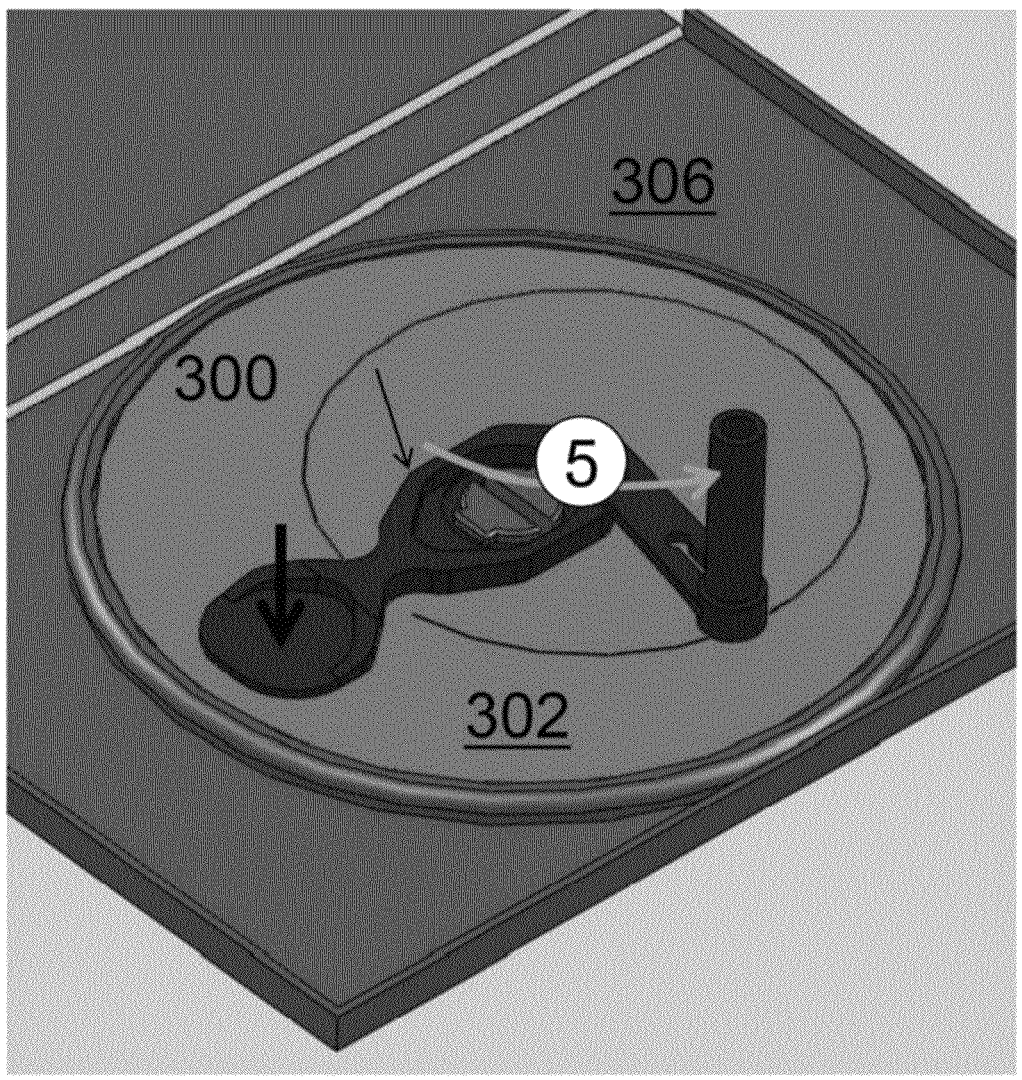
Figure 4O:
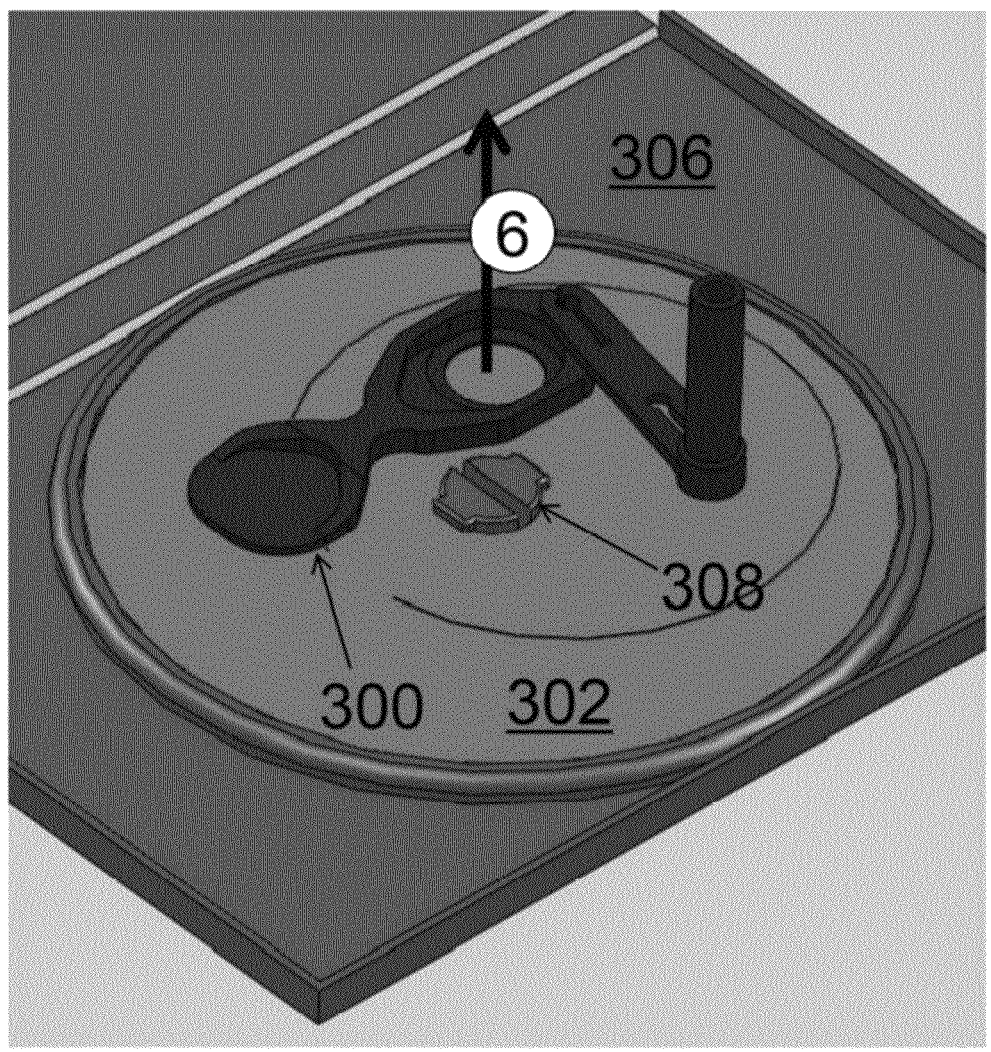
Figure 4P:
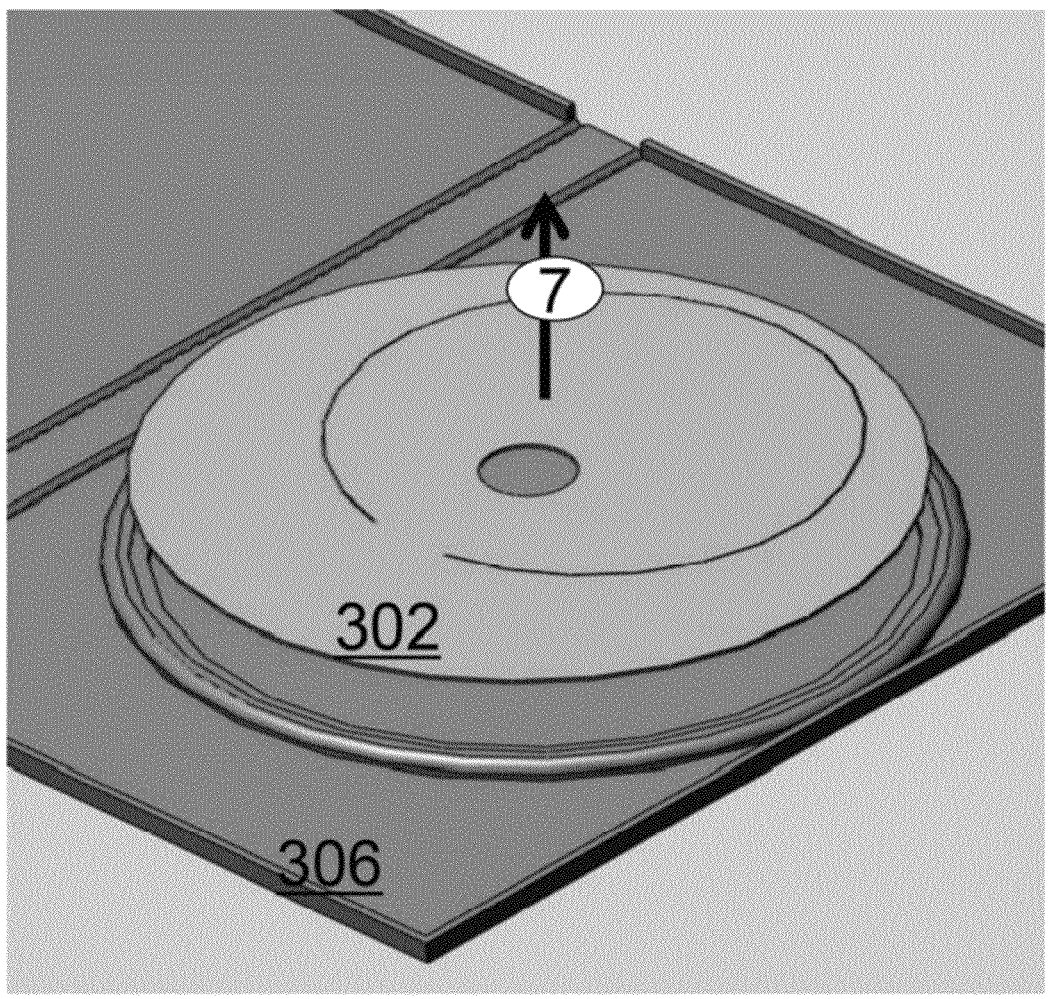

FIG. 4A-4P describes the design, components, assembly, and operation of a Field Retirement Tool 300 for content stored on Read Only Optical Media. The Field Retirement Tool 300 for Optical Media mars the optical storage media 302 with a groove 304 that alters the storage media and sufficiently disables the stored content to content owner requirements. One example non-limiting tool 300 is designed to use a DVD carrier case 306 as its base and its center hub 308 to stabilize the tool in operation. The following describes the drawings:

FIG. 4A shows an example non-limiting ISO standard DVD, CD, or Blu-ray optical disc. The tool 300 is used to alter media on these discs.

FIG. 4B shows a region 310 of media alteration. The tool 300 will disturb the storage media of the disc 302 while preserving the lead in and lead out areas of the disc. The region of media alteration created by the tool 300 is anywhere between 53 and 110 mm centered diameter of the optical disc.

FIG. 4C describes an example non-limiting pattern of media alteration. The pattern is an 81.5 mm circle that has a center offset 14.25 mm from the center of the optical disc.

FIGS. 4D-4F describe the components of the Field Retirement Tool 300. Three components comprise an example tool. FIG. 4D shows the base 300a of the tool, FIG. 4E describes the Arm 300b of the tool and FIG. 4F describes the Scribe 300c. The exemplary illustrative non-limiting tool 300 is easy to assemble and disassemble in order to provide compactness and ease of transportation. For example, the particular non-limiting implementation shown can be shipped in a very compact form in its disassembled kit form, and the user can be instructed to assemble the components into a tool 300.

In the example shown, the scribe 300c comprises a cylindrical post having a section 350 of reduced circumference terminating in a sharp 352. The sharp 352, which may comprise a pointed element of metal or other hard substance, is used to scribe a groove in an optical disk as described below. The remainder of tool 300 is used to guide the sharp 352 to follow a predetermined trajectory on the surface of a disk 302 to intentionally destroy content areas without destroying other disk portions that can be read by conventional disk reading drives to nevertheless positively identify certain disk characteristics such as for example volume ID, title, manufacturer, first or other short (e.g., 10 seconds) of content, etc.

In the example shown, the scribe 300c reduced circumference section 350 is dimensioned to be insertable into a receptacle portion 354 of arm 300b. The receptacle portion 354 has a through hole that both snugly retains the scribe's reduced circumferential section 350 while permitting the scribe's sharp 352 to protrude through and contact the surface of disk 302. At the other end of arm 300b, a pin 356 protrudes downwards. This pin 356 is dimensioned to be accepted by a hole 358 disposed on a triangular projecting portion 360 of tool base 300a. Tool base 300a comprises a planer member having hole 358 there through as well as a further hole 362 that is dimensioned to accept and pivot around the projecting hub 308 of a conventional standard disk case 306. Tool base 300a further provides a projecting thumb member 364 having a depression 366 therein dimensioned to accept a human thumb.

FIG. 4G shows an exploded view of how the components of the tool 300 are assembled. The scribe 300c fits into the arm 300b with sufficient clearance for the scribe to rotate in the arm fitting. The arm 300b snap fits into the base 300a with sufficient clearance for the arm to rotate in the base fitting.

FIG. 4H shows the completed assembly of the tool 300.

FIGS. 4I, 4I-1 and 4I-2 show placement of a DVD, CD or Blu-ray disc 302 into a standard carrying case 306 with its data side facing up.

FIGS. 4J-1, 4J-2 and 4J-3 show installation of the tool 300 onto the DVD case 306 with the center hole 308 of the case securing the retirement tool 300 mechanism.

FIG. 4K describes the operation of the field retirement tool 300. The thumb of one hand is used to hold the tool 300 in place while the other hand is used to reset the scribe 300c until it is resting against a side of the tool base 300a.

FIG. 4L describes the operation of the tool 300 to alter the storage media of the DVD, CD or Blu-ray disc. While still applying downward pressure with the thumb of one hand on the outside edge of the tool 300, the second hand is used to grasp and rotate the scribe handle 300c with slight downward pressure to create a circular scratch of predetermined trajectory that permanently and irreversibly alters the media on the data side of the disc. During this operation, the base portion 300a is held in a stationary position by downward thumb pressure and retention by hub 308, and arm 300b with attached scribe 300c rotates about the base hole 358. This operation causes scribe sharp 352 to scribe only selected portions of the surface of disk 302 in a predetermined repeatable way in a circular or other path that is located eccentrically relative to the center of the disk but which intersects substantially all information tracks the disk defines except at the disk periphery. Conventional disk reading technology will thus be able to automatically electronically read the volume ID and first few tracks on the disk but then fail to read the remaining (majority) of information tracks, thereby destroying the disk for playback use. The groove that scribe sharp 352 traces in this example intersects most disk information tracks at least twice, making it difficult or impossible for data reconstruction algorithms to reconstruct a playback stream from the remaining data without significant degradation of quality and effectively destroying most of the disk surface for useful content playback by most commercially available consumer playback devices.

FIG. 4M describes the completion of the media alteration of the disc.

FIG. 4N describes how the scribe arm 300b is moved to facilitate the removal of the tool 300 from the center hole ejection mechanism.

FIG. 4O describes the removal of the tool 300 from the center hold of the DVD or Blu-ray disc case 306.

FIG. 4p describes the removal of the altered DVD, CD, or Blu-ray disc 302 from the case 306.

Example Non-Limiting Alteration

FIG. 5 depicts an example non-limiting signal path for reading data on an optical disc such as CD, DVD, BD. For this embodiment, the ECC processing engine [51] is highlighted.

FIG. 6 depicts several example non-limiting format details found within the prior art of the 32 KiB ECC block of an example DVD. Highlighted for this particular example are the error correcting parity codes which are arranged in both row (PI) and column (PO) directions. The rows and columns of the ECC block are built with ECC symbols. Each symbol comprises one byte of code data. ECC code data comprises both payload (2048 bytes user data per frame) and error correcting codes and other overhead data.

FIG. 7 shows an example of how inner parity (PI) is used within the ECC processing engine of the prior art to correct for row symbol errors. If a particular row is correctable, then there will be no PI failure for that row. In the event that a row incurs a PI failure due to too many symbol errors in the row, it is then passed on to the outer parity engine for further processing.

The FIG. 8 diagram shows an example from the prior art of how the outer parity engine (PO) is used for correction in the event that one or more rows in the ECC block were not correctable (PI event).

FIG. 9 illustrates an example processor for sensing and monitoring corrected PI/PO event counts via a diagnostic software port [92]. This diagram shows the diagnostic portal providing real-time parametric data from a PI/PO sensor module [91] associated with the ECC processing engine [51] during various disc playback modes, where user data is processed, and placed into a data buffer [52].

FIG. 10 shows an example from the prior art of how data can be processed during playback from various locations on an optical disc. A DVD is shown in the example diagram as depicted in ECMA-267. A host device can address data on the optical device using a logical block address (LBA, not shown). Each 2 KiB data sector is assigned a logical address that is mapped to a physical sector number as shown in the diagram. The action of sensing ECC parametric data can be done while a host device is performing a playback operation in any of the various data zones on a disc. For example, the drawing shows a Data Zone, Lead-out Zone, Lead-in Zone. In addition there may be other zones depending on the specific layout of the disc, such as the Middle Zone of a dual layer DVD (not shown).

FIG. 11 shows a prior art example of how, in addition to reading back data from any of the information zones, a burst cutting area can be used as an alternate zone from which data can be read. For the particular embodiment shown in these several diagrams, an ECC engine will be processing data codes during playback and can therefore be monitored as a data sensor for that zone.

FIG. 12 shows example non-limiting actual PI/PO data [121] taken from a DVD drive during a readback operation in an LBA area of a DVD which has been 'flagged' or marked for automatic detection. For this example, the flag is a micro sized scratch-like inclusion [181] placed at a particular radius on a DVD disc. The inclusion partially perturbs the readback data nearby the flag. Since a small portion of data will have been made inaccessible, or partially 'destroyed' nearby the flag, we can consider the partial destruction to be possibly corrected fully by the ECC engine [51]. The flag then appears in the data set as a once-per-rev blip pattern of PI/PO correction events [121] associated with the ECC blocks affected by the flag. In between the correction events are passages of ECC blocks requiring relatively little or no error correction [131]. All ECC blocks shown exhibit the full user data set being recovered in any event. That is, the ECC engine [51] is able to correct for any naturally occurring errors (user damage) as well as any inherent errors due to possible manufacturing defects, and also for the permanent flag of this embodiment, and its related data which may be partially destroyed to at least some fully recoverable extent. The once-per-rev pattern [121] has discernible characteristics which allow it to be distinguished from other noise-like patterns which may occur due to other phenomenon such as scratches or disc mastering defects from the disc replication manufacturing process.

FIG. 13 shows an example non-limiting pattern of zero (or relatively low) PI/PO error correction counts [131] over an area of a DVD disc which has not been flagged with a license transaction mark. In this depiction one can clearly see the hallmark signs showing the presence of a mark as shown in FIG. 12, or the lack of a mark as shown by the relatively lower PI/PO counts in FIG. 13. The signal detection algorithm which is looking for the presence of a license transaction flag can use certain hallmark signs of a purposefully placed flag as shown in this example. A few hallmark signaling examples are presented here: 1). Once-per-rev PI/PO blip pattern [121]. 2). Pattern is located only at certain LBA address ranges [122] and not at others. 3). An apriori known number of flag marks may be required in certain logical or physical locations [101] in order to claim positive detection of a flagged DVD.

It should be noted in the example embodiment that a flagged disc is fully playable, just as would be a non-flagged disc. Only the proposed signal detection algorithm will take notice of the ECC correction parametric events affected by the transaction flag. For other purposes (like normal playback of the disc in a player device) the flagging of a disc in this embodiment comprises a non-destructive event. The user will not know that her disc has been flagged since she can still watch her movie normally.

FIG. 14 shows background detail for example non-limiting numerical aperture optics found in a typical DVD device. A DVD red laser [141] is focused to a target spot [145] by way of a lens [142] to the media layer [144] of an optical read-only disc [143]. Data is written into the media layer [144] by way of placing pits and lands in a replication stamping process (not shown).

FIG. 15 also shows background detail for an example non-limiting method used in re-writable DVD devices to write data into the Recording layer [151] of re-writable DVD media. Re-writable methods typically may use laser power levels for writing data which may be higher than the power applied during the data readback process. This diagram depicts 15 mW as an example for the maximum laser power. The maximum power would be dependent on a number of considerations, comprising rotational speed, and recording media material, among other considerations.

FIG. 16 offers a suggested example non-limiting embodiment for an automated flag writing process. As an example, the DVD writing laser [141] can be applied to the media layer [144] of a read-only disc to raise the local temperature of the [144] media layer material (e.g. Aluminum) to a point that approaches the media material's melting point or beyond. In this embodiment, the DVD drive is momentarily instructed to bypass write-protect mechanisms for read-only media. In this example the flag writing process aims to affect the reflectivity of the media layer only to an extent such that when read back, the corresponding ECC block data will require PI/PO corrections which can be sensed via an ECC block parametric sensor, or diagnostic port [92]. Such an automated process may use laser power levels [162] beyond the normal levels which might be applied to re-writable media. For this purpose, we can consider power levels higher than 15 mW, and even perhaps higher than 100 mW. Certain high speed rewritable DVD devices are known to use laser power levels well above 100 mW for example when writing to recordable media at relatively high rates of spindle rotation speeds. For the purpose of this embodiment we can consider using a relatively high power write laser and/or relatively slower spindle rotational speeds to achieve the goal of altering the read-only media's reflectivity characteristics in order to induce purposefully placed, correctable error inclusion patterns [171, 181, 191] to the ECC blocks of the pre-recorded media layer [144] of replicated read-only discs. As shown in this and other diagrams, one or more license transaction flags can be placed at certain known locations [101], where their presence, or lack thereof, can be reliably detected using the diagnostic port [92] of the ECC processing engine [91]. As shown, a mark pattern can be written using a relatively high power burst of laser energy [161], burst onto the media layer for only a relatively short period of time (shown in the diagram as 'T'), with the intended purpose to alter only as much media material as is required in order to place a transaction flag, but in this embodiment not so much as to render the media fully inoperable.

FIG. 17 shows an example non-limiting size, shape and location of a license transaction flag [171]. In this drawing is shown a preferred embodiment mark location, written in a 'safe' zone—that is, outside of the data zone [172] (where the transport stream data of an audio-visual work may be located) but nonetheless in a region where data patterns would be written together with their associated error correcting code data. The example mark is shown to be several tracks in width to enable the once-per-rev PI/PO pattern [121] previously mentioned when monitoring several revolutions of readback data nearby the expected mark location. In addition, the example mark is depicted as spanning one or more rows in a physical data frame, along the circumferential direction of a spiral track. In this embodiment, an example DVD row of 182 bytes will span a distance of approximately 0.4 mm along the arc of a spiral track. For illustration it can also be noted that a DVD track pitch is typically 0.74 microns. For illustration purposes only, the suggested flag in this embodiment diagram might have the dimensions of approximately 1 mm in length [174] (spanning one or more rows), and several microns in width [175] (spanning one or more spiral tracks [176]).

FIG. 18 shows another example non-limiting embodiment providing an example non-limiting transaction flag in the shape of a dot, or circle, located in the data zone of an optical disc [181]. Since the transaction flag is purposefully made to be a non-destructive mark, this example shows that placing the flag within a data zone [172] containing transport stream user data can be a workable location for the proposed flag, while still maintaining full playback capability due to the aforementioned ECC PI/PO correction apparatus. For this embodiment, the spindle speed when writing the flag can be considered to operate at or near zero rotational velocity, in which case the focused laser would create a beam shape in the form of a dot, or circle [181] on the media layer.

FIG. 19 shows another example non-limiting embodiment where the transaction flag is designed to span the width of only a single spiral track [191], located in a lead-out or middle zone [173]. For this embodiment the writing laser is focused to a very narrow point [145] such that the localized heat dissipates readily, prior to the heat transferring to a neighboring data track while the spindle rotates, causing a narrow, line shaped mark pattern [191].

FIG. 20 shows another example non-limiting embodiment in which an upgrade transaction is processed and associated with a previously serialized media disc [201]. The serial number may be found for example in the burst cutting area (as shown in the figure near the inner diameter of the disc [202]). Once the consumer agrees to pay an upgrade fee, a centralized server [203] is used to associate the serialized disc with the upgraded status, licensed to the consumer's account [204].

While the technology herein has been described in connection with exemplary illustrative non-limiting embodiments, the invention is not to be limited by the disclosure. The invention is intended to be defined by the claims and to cover all corresponding and equivalent arrangements whether or not specifically disclosed herein.

We claim:

1. A method for supporting a controlled transaction associated with content stored on replicated, read only, optical storage media comprising:
   electronically identifying content stored on an original physical optical storage medium;
   electronically determining if an owner or authorized intermediary of the identified content has authorized the content for a transaction;
   electronically inspecting the physical medium and identified content to confirm it is an original replicated read only optical media product and not a copy;
   electronically inspecting the original physical medium to detect the presence of transaction flag(s) on the medium;
   electronically retrieving at least one policy governing the transaction including a pattern of media alterations, the number of media alterations, and location of media alterations to be placed onto the physical medium;
   if required by the at least one policy, automatically placing medium alterations into specific locations of the original physical medium comprising using an optical disc drive under software control to alter reflectivity of the original physical medium, thereby creating a transaction flag(s) on the original physical medium;
   automatically, electronically verifying the presence of the transaction flag(s) and
   confirming that the transaction flag(s) is associated with the original physical medium, and
   based on electronic verification and confirmation, electronically engaging in a transaction associated with the content stored on the original, replicated, optical media product from the owner of the identified content or the authorized intermediary.

2. The method of claim 1 wherein the flag comprises changes in media reflectivity such that
   a. the pattern, location, and number of media alterations is used to determine the presence of a flag or lack thereof.

3. The method of claim 2 wherein the pattern is used to associate multiple flags to the medium, where
   a. multiple flags are used to select from among a set of one or multiple possible transaction levels associated with the media.

4. A method of claim 1 wherein a laser is used to alter the physical media to induce a reflectivity change in the physical media.

5. A method of claim 1 where a powered actuator and cutting device is used to alter the physical media to induce a reflectivity change in the physical media.

6. A method of claim 1 wherein the writing laser of a standard optical disc drive mechanism is controlled by software to induce a reflectivity change in the media.

7. The method of claim 6 wherein the energy of the write laser is concentrated on the media by software commands that slow or stop the rotation of the media to create a reflectivity change in the media.

8. A method of claim 1 wherein alterations of the media are created that are greater than the spot size of the laser through software control of mechanical components.

9. A method of claim 1 wherein the physical limit of the writing laser actuator creates a reference point of origin from which locations of media alterations are defined by software.

10. The method of claim 9 wherein media is altered at any location on the storage medium including data and non data locations by software command, irrespective of those locations being data tracks, sectors or any location that is accessible by the write laser.

11. A method of claim 1 wherein radial marks are created by powering the laser to alter the media, then actuating the write laser to move in a radial direction and repeating the operation.

12. A method of claim 1 wherein complete obliteration of the aluminum layer of the physical media is achieved by software commands that loiter the powered write laser over the physical media.

13. The method of claim 1 further including using software commands to alter the function of an industry standard optical disc drive hardware.

14. A method for supporting a controlled transaction associated with content stored on replicated optical storage media comprising:
   a. electronically identifying content stored on an original physical optical storage medium;

electronically determining if an owner or authorized intermediary of the identified content has authorized the content for a transaction;

electronically inspecting the physical media and stored content to confirm it is an original replicated optical media product and not a copy;

electronically inspecting the original physical media to detect the presence of transaction flags;

electronically retrieving policies governing the transaction including, but not limited to the pattern, number, and location of media alterations to be placed into the physical medium;

b. if required by policy, electronically enabling the placement of media alterations(s) onto the original physical medium comprising a powered fixture and writing mechanism to alter reflectivity of the original physical medium thereby creating a transaction flag(s) into the physical media;

c. automatically, electronically verifying the presence of the transaction flag(s) and confirming the flag is associated with the original physical medium;

and based on electronic verification and confirmation, electronically engaging in a transaction associated with the content stored on the original replicated optical media product from the content owner or their authorized intermediary.

15. A method of claim 14 wherein a laser is used to alter the physical media to induce a reflectivity change in the physical media.

16. A method of claim 14 where a powered actuator and cutting device is used to alter the physical media to induce a reflectivity change in the physical media.

* * * * *